United States Patent [19]

Sakurai et al.

[11] Patent Number: 5,568,198

[45] Date of Patent: Oct. 22, 1996

[54] POWER SUPPLYING APPARATUS FOR A CONNECTING APPARATUS AND A VIDEO TAPE RECORDER HAVING A BUILT-IN CAMERA

[75] Inventors: Nobumasa Sakurai, Saitama; Hidero Mitsui; Yoshisada Okayasu, both of Kanagawa, all of Japan

[73] Assignee: Sony Corporation, Tokyo, Japan

[21] Appl. No.: 468,311

[22] Filed: Jun. 6, 1995

Related U.S. Application Data

[62] Division of Ser. No. 112,475, Aug. 27, 1993, Pat. No. 5,465,117.

[30] Foreign Application Priority Data

| Sep. 2, 1992 | [JP] | Japan | 4-259112 |
| Sep. 2, 1992 | [JP] | Japan | 4-259113 |
| Sep. 2, 1992 | [JP] | Japan | 4-259114 |

[51] Int. Cl.$^6$ .................................................. H04N 5/225
[52] U.S. Cl. .......................... 348/372; 348/373; 348/375
[58] Field of Search ................................. 348/207, 372, 348/373, 374, 375, 376; 358/906, 335; H04N 5/225

[56] References Cited

U.S. PATENT DOCUMENTS

| 2,225,460 | 12/1940 | Porth . |
| 2,266,686 | 12/1941 | Emanuel . |
| 3,667,026 | 5/1972 | Bogut et al. . |
| 3,917,990 | 11/1975 | Sherman, Jr. . |
| 4,006,396 | 2/1977 | Bogut . |
| 4,123,598 | 10/1978 | Hammel . |
| 4,315,364 | 2/1982 | Leggingwell . |

(List continued on next page.)

FOREIGN PATENT DOCUMENTS

| 0480706A1 | 4/1992 | European Pat. Off. | H01M 2/10 |
| 0549950A1 | 7/1993 | European Pat. Off. | H01M 2/34 |
| 0572327A1 | 12/1993 | European Pat. Off. | H01M 2/10 |
| 91 12 374.7 | 2/1992 | Germany | H01M 2/30 |
| 59-167098 | 9/1984 | Japan | H05K 5/02 |
| 3-52555 | 3/1991 | Japan . |
| 1487604 | 10/1977 | United Kingdom | H01M 2/02 |
| WO92/11679 | 7/1993 | WIPO | H01M 10/40 |

OTHER PUBLICATIONS

Sony Rechargeable Battery Pakc, NP–55/55H/66/66H/77/77H Instruction Sheet, Sony Corporation, 1991.
Sony Rechargeable Battery Pack, NP–60D Instruction Sheet.

*Primary Examiner*—Wendy Greening
*Assistant Examiner*—Tuan V. Ho
*Attorney, Agent, or Firm*—Ronald P. Kananen

[57] ABSTRACT

A built-in camera type video tape recorder can be loaded on a connecting apparatus for connecting the built-in camera type video tape recorder having video signal, audio signal, and control signal terminals and a power supply connecting terminal to other electrical machinery and apparatus. It comprises a supporting member formed at one side wall of the built-in camera type video tape recorder and having a shutter member, the shutter member being opened in a ganged relation with a shutter which is opened when the built-in camera type video tape recorder is loaded on the connecting apparatus, and a terminal portion facing an opening portion of the shutter member and the supporting member and being electrically connected to a signal input and output portion projected from the opening portion opened when a shutter of the connecting apparatus is opened. A connecting apparatus for connecting such a built-in camera type video tape recorder comprises an apparatus body being connected to the other electrical machinery and apparatus via a cable, an input and output terminal portion for connecting respective terminals of the built-in camera type video tape recorder to the apparatus body, the built-in camera type video tape recorder being loaded onto the apparatus body, a shutter mechanism for opening a shutter provided on the apparatus body by a slide operation, and a terminal portion for electrically connecting the signal input and output terminal portion.

11 Claims, 25 Drawing Sheets

U.S. PATENT DOCUMENTS

| | | |
|---|---|---|
| 4,329,406 | 5/1982 | Dahl et al. . |
| 4,468,605 | 8/1984 | Fitzgerald et al. . |
| 4,530,034 | 7/1985 | Kawarada . |
| 4,576,880 | 3/1986 | Verdier et al. . |
| 4,637,965 | 1/1987 | Davis . |
| 4,737,420 | 4/1988 | Ikeda et al. . |
| 4,943,498 | 7/1990 | Cooper et al. . |
| 4,969,206 | 11/1990 | Desrochers . |
| 4,997,731 | 3/1991 | Machida et al. . |
| 5,057,383 | 10/1991 | Sokira . |
| 5,111,128 | 5/1992 | Branan, Jr. et al. . |
| 5,132,800 | 7/1992 | Wada et al. ............ 348/372 |
| 5,136,620 | 8/1992 | Eaves . |
| 5,183,714 | 2/1993 | Mitsui et al. . |
| 5,200,686 | 4/1993 | Lee . |
| 5,208,116 | 5/1993 | Joh . |
| 5,220,369 | 6/1993 | Sasaki ..................... 348/372 |
| 5,227,262 | 7/1993 | Ozer . |
| 5,248,927 | 9/1993 | Takei et al. . |
| 5,341,171 | 8/1994 | Mori et al. ............... 348/373 |
| 5,399,446 | 3/1995 | Takahashi . |
| 5,415,947 | 5/1995 | Mitsui et al. . |
| 5,437,938 | 8/1995 | Mitsui et al. . |
| 5,465,117 | 11/1995 | Ide et al. . |

POWER SUPPLYING APPARATUS FOR A CONNECTING APPARATUS AND A VIDEO TAPE RECORDER HAVING A BUILT-IN CAMERA

This application is a division of application Ser. No. 08/112,475 filed Aug. 27, 1993, now U.S. Pat. No. 5,465,117.

BACKGROUND OF THE INVENTION

1. Field of the Invention

The present invention relates to a connecting apparatus for a built-in camera type video tape recorder (VTR) suitable for connecting the built-in camera type VTR to other electrical machinery and apparatus such as a television receiver, a video tape recorder, or the like.

2. Description of the Prior Art

It is customary that a picture taken by a built-in camera type VTR is recorded and/or reproduced by a television receiver and further transposed into other video tape recorder in a so-called dubbing fashion. As shown in FIG. 1, when a picture reproduced by a built-in camera type VTR 300 is transposed by a video tape recorder 310 in a dubbing fashion or recorded and/or reproduced by a television receiver 311, the built-in camera type VTR 300 and the video tape recorder 310 or the like are connected by means of a signal cable 320. In this case, the recording, the reproduction, or the like, can be effected by using a rechargeable battery 301 detachably attached to the rear surface of the built-in camera type VTR 300 as a power supply. In the case of extended recording, reproducing, or the like, an AC adaptor (not shown) is connected to the built-in camera type VTR 300 to directly supply the power to the built-in camera type VTR 300 from a commercial plug socket so that the recording, the reproduction or the like can occur.

One conventional AC adaptor can recharge the rechargeable battery 301. When the rechargeable battery 301 is recharged, an AC adaptor cord is detached from the built-in camera type VTR 300 and the rechargeable battery 301 is attached to the AC adaptor.

When a picture taken by the built-in camera type VTR 300 is transposed into the video tape recorder 310 in a dubbing fashion or recorded and/or reproduced by the television receiver 311, the built-in camera type VTR 300 and the video tape recorder 310 or the like must be connected via the signal cable 320 or the like and the connection thereof becomes cumbersome. Further, if the rechargeable battery 301 is recharged each time the recording, reproducing, or the like is carried out, the rechargeable battery 301 is detached from the AC adaptor. If the rechargeable battery 301 is recharged after the recording, reproducing, or the like has ended, the rechargeable battery 301 must be attached to the AC adaptor. Therefore, the battery recharging procedure also becomes cumbersome.

In view of the aforesaid aspect, when a picture taken by the built-in camera type VTR 300 is recorded and/or reproduced by the television receiver 311, a connecting apparatus has been prepared. This previously-proposed connection apparatus includes a connecting apparatus called a station on which the built-in camera type VTR 300 connected to the television receiver 311 via a cable without the signal cable 320 is mounted so that the recording and/or reproducing can be carried out with ease.

The built-in camera type VTR that is applied to the aforesaid connecting apparatus includes a connection terminal disposed on the rear surface thereof so that, when the video tape recorder having the built-in camera is connected to the connecting apparatus, the built-in camera type VTR must be attached to the connecting apparatus after the rechargeable battery attached thereto had been detached. As a result, the connection becomes troublesome.

OBJECTS AND SUMMARY OF THE INVENTION

Therefore, it is an object of the present invention to provide an improved connecting apparatus in which the aforesaid shortcomings and disadvantages encountered with the prior art can be eliminated.

More specifically, it is an object of the present invention to provide a built-in camera type video tape recorder which can be electrically connected to a connecting apparatus in a so-called one-touch fashion without using an exclusively-designed cable and which can be readily loaded on and unloaded from the connecting apparatus.

It is another object of the present invention to provide a connecting apparatus by which a built-in camera type video tape recorder can be readily loaded on and unloaded from the connecting apparatus in a so-called one-touch fashion while a battery is freely attached or detached.

It is a further object of the present invention to provide a power supplying apparatus for a built-in camera type video tape recorder in which an AC adaptor can be accommodated within an exclusively-designed accommodating compartment of a connecting apparatus to supply power to the connecting apparatus.

It is yet a further object of the present invention to provide a power supplying apparatus for a built-in camera type video tape recorder having a battery charging function.

According to a first aspect of the present invention, a built-in camera type video tape recorder (VTR) is provided that can be loaded on a connecting apparatus for connecting the built-in camera type video tape recorder having video signal, audio signal, and control signal terminals and a power supply connecting terminal to other electrical machinery and apparatus which comprises a supporting member formed at one side wall of the built-in camera type video tape recorder and having a shutter member, the shutter member being opened in a ganged relation with a shutter which is opened when the built-in camera type video tape recorder is loaded on the connecting apparatus, and a terminal portion facing an opening portion of the shutter member of the supporting member and being electrically connected to a signal input and output portion projected from the opening portion opened when a shutter of the connecting apparatus is opened.

According to a second aspect of the present invention, a connecting apparatus is provided for connecting a built-in camera type video tape recorder having video signal, audio signal, and control signal terminals and a power supply connecting terminal to other electrical machinery and apparatus which comprises an apparatus body being connected to the other electrical machinery and apparatus via a cable, an input and output terminal portion for connecting respective terminals of the built-in camera type video tape recorder to the apparatus body, the built-in camera type video tape recorder being loaded onto the apparatus body, a shutter mechanism for opening a shutter provided on the apparatus body by a slide operation, and a terminal portion for electrically connecting the signal input and output terminal portion, which is projected from an opening portion in a ganged relation with the shutter opening mechanism, to respective terminals of the built-in camera type video tape recorder.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

A connecting apparatus for a built-in camera type VTR according to the present invention will hereinafter be described with reference to the drawings.

Figure 1:
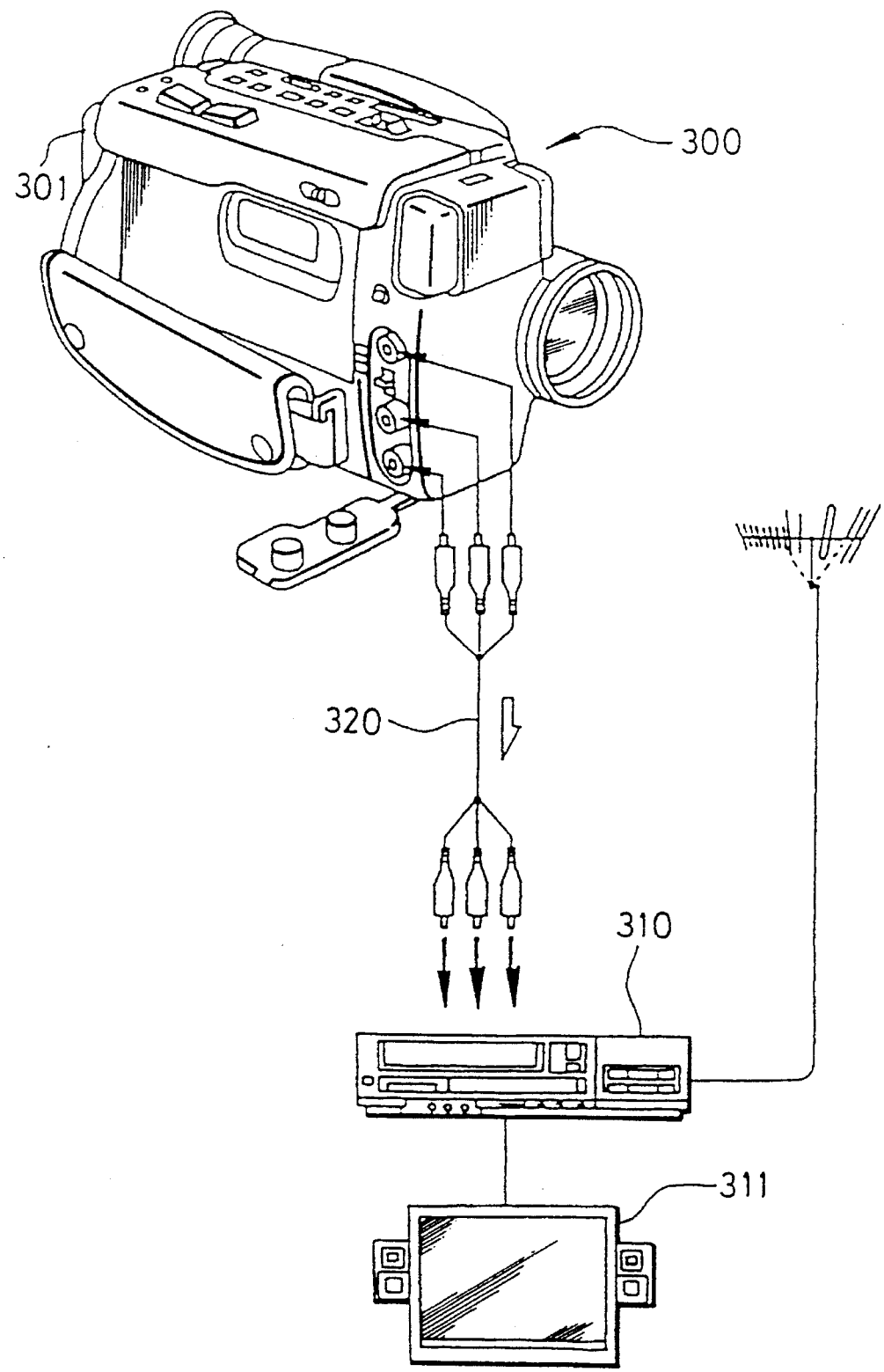
FIG. 1 is a perspective view showing the condition that a conventional built-in camera type VTR is in use.
Figure 2:
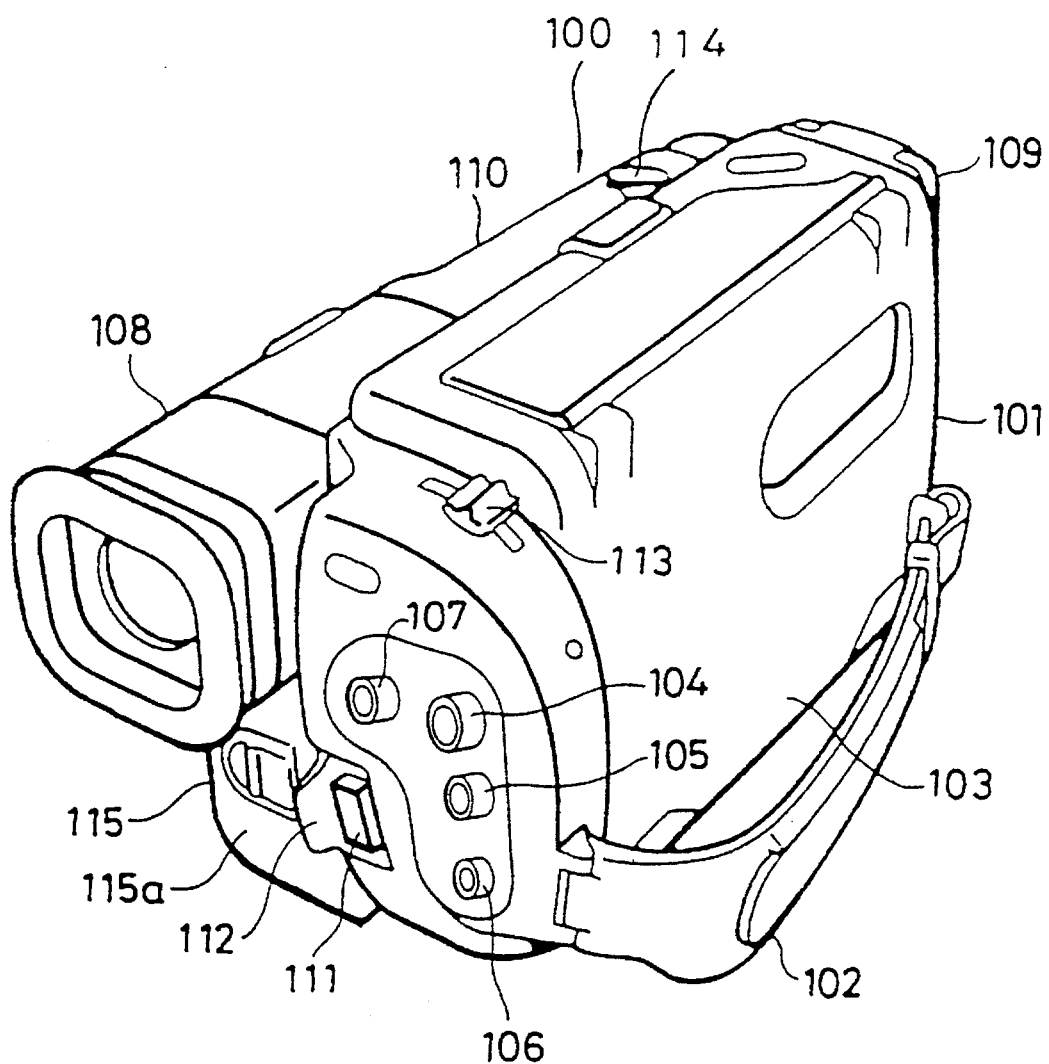
FIG. 2 is a perspective view of a built-in camera type VTR in which an embodiment of the present invention is used.

Initially, a main arrangement of a built-in camera type VTR will be described with reference to FIG. 2. As shown in FIG. 2, an 8-mm built-in camera type VTR is provided that is generally depicted by a reference numeral 100. The built-in camera type VTR 100 includes a VTR body 101 having a side wall facing a grip belt 102 which serves as a VTR deck portion 103. The VTR deck portion 103 includes on its front wall a video terminal 104, an audio input terminal 105, an audio output terminal 106 and an S video terminal 107 through which video and audio signals are input into and/or output from the VTR body 101. These terminals 104 through 107 are connected to other electrical machinery and apparatus such as a television receiver set, a VTR or the like through a cable (not shown), whereby the recording, the reproduction or the dubbing can be effected.

The VTR body 101 includes a viewfinder 108 disposed on its portion opposite to the grip belt 102. Further, the VTR body 101 includes a microphone 109 disposed on the upper front portion of the VTR body 101, and a lens tube body 110 projected under the microphone 109.

The VTR deck portion 103 includes a shooting start button 111 disposed at its rear wall so that a camera person can operate the start button 111 with the thumb of a right hand. The shooting start button 111 includes a standby button 112 so that, when the standby button 112 is opened, the shooting condition is completed. The camera is placed in a non-shooting condition by closing the standby button 112.

The VTR deck portion 103 also includes a zoom lever 113 disposed on its upper rear portion. When the camera person operates the zoom lever 113 with the index finger of a right hand, an object can be captured in a telephoto state by a so-called zoom-in operation of the zoom lever 113. The object can also be captured in a wide-angle state by a so-called zoom-out operation of the zoom lever 113.

The lens tube body 110 includes on its upper wall an operation lever 114. When the camera person operates the operation lever 114, the built-in camera type VTR 100 is switched to the shooting mode and/or the video mode across an off-point serving as a neutral point. When the operation lever 114 is switched to the shooting mode side, a lens cover (not shown) that is disposed at the front surface of the lens tube body 110 is opened and the built-in camera type VTR 100 can be set in a shooting condition. When the operation lever 114 is set in the video mode side, the lens cover remains closed.

On the rear wall of the VTR main body 101 under the view finder 108, there is provided a battery pack accommodating portion 115 which will be described later in this description of the invention. When the lid 115*a* is opened or closed, a battery can be inserted into or detached from the battery pack accommodating portion. The battery pack is a power supply which supplies power to the VTR 100.

The built-in camera type VTR 100 includes a supporting plate 116, a supporting plate disposed on its bottom wall portion that is used to mount the VTR 100 on a station 1 which will be described later in this invention description. The supporting plate 116 will be described particularly with reference to FIGS. 3 and 4.

Figure 3:
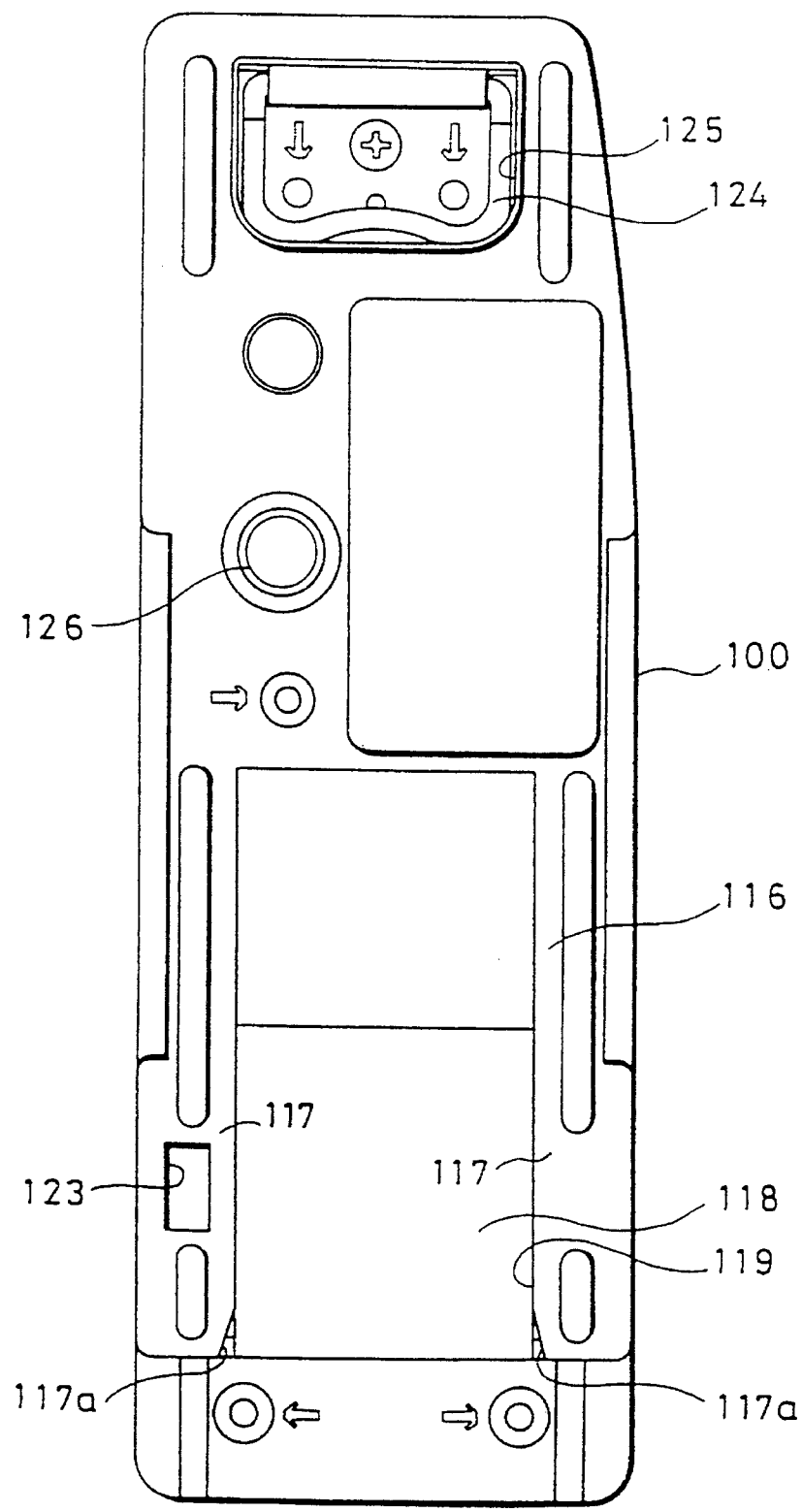
FIG. 3 is a bottom view of the built-in camera type VTR shown in FIG. 2.
Figure 4:
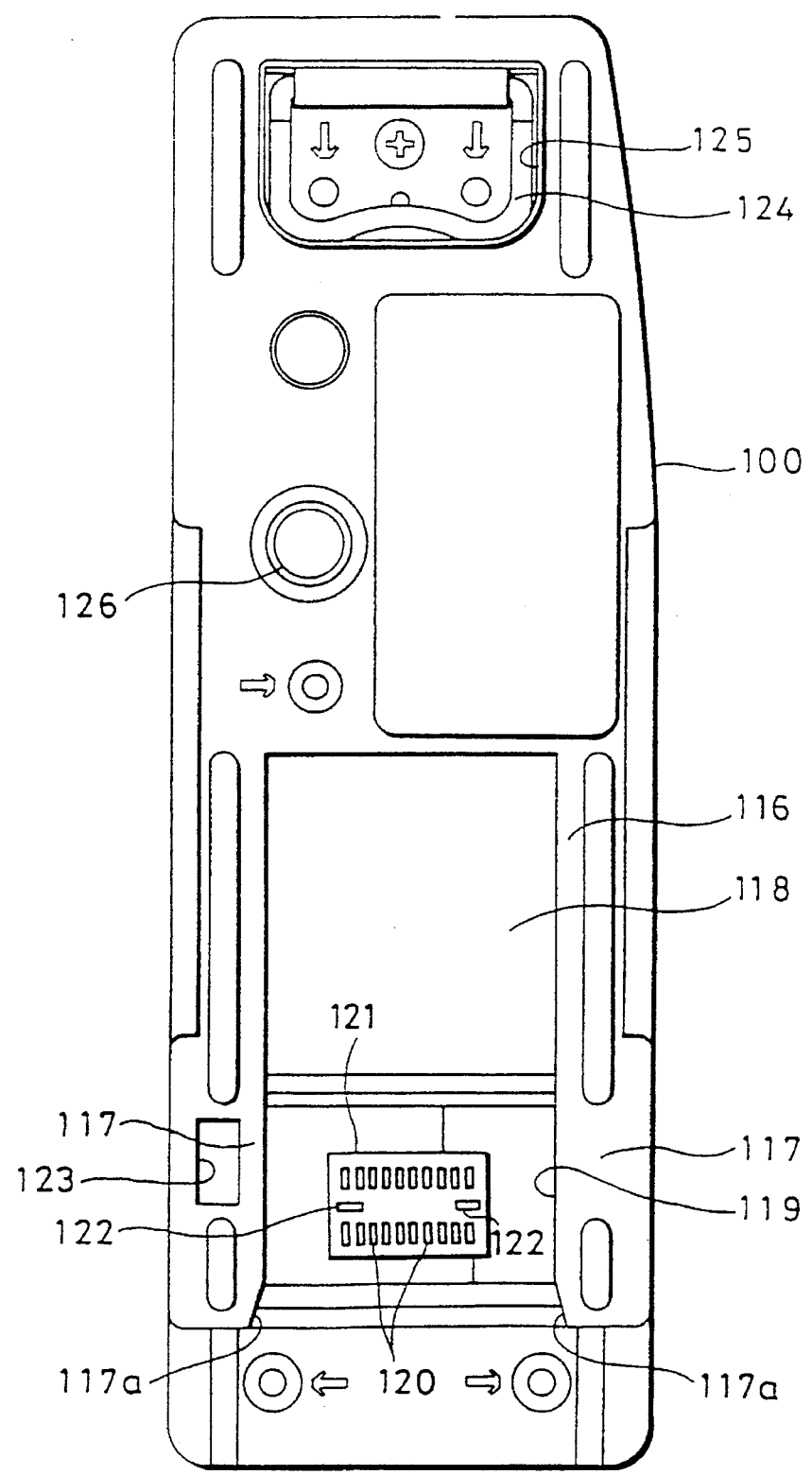
FIG. 4 is a bottom view of the built-in camera type VTR shown in FIG. 3 under the condition that the shutter plate thereof is opened.

As shown in FIGS. 3 and 4, the supporting plate 116 includes on its rear side a pair of left and right guide rails 117, 117 extended in the front to rear direction (i.e., in an upper to lower direction in the sheets of drawings forming FIGS. 3 and 4). A shutter plate 118 is attached to the guide rails 117, 117 so that the shutter plate 118 can be moved along and parallel to the guide rails 117, 117 in a back and forth direction so as to open and/or close an opening window 119 formed through the supporting plate 116. The opposed, top inner edge portions of the guide rails 117, 117 best seen in the lower portions of FIGS. 3 and 4, are recessed as tapered faces 117*a*, 117*a*. The shutter plate 118 is biased by a spring member (not shown) in a direction which tends to close the opening window 19. A terminal portion 121 having a number of terminal contacts 120 is disposed in an opposing relation to the opening window 119 as shown in FIG. 4. The terminal portion 121 has formed concave portions 122 on its central portion. A concave portion 123 is also formed on the supporting plate 116 at one side of the shutter plate 118.

The supporting plate 116 includes on its front side a stand 124 disposed so as to be erectable. When the stand 124 is erected, the stand 124 can be used as a stand for the built-in camera type VTR 100. The stand 124 can be accommodated within a concave portion 125 when it is made flat. The supporting plate 116 includes a tapped hole 126 formed the supporting plate so that the supporting plate 116 can be attached to a tripod or a like supporting member through the tapped hole 126.

Figure 5:
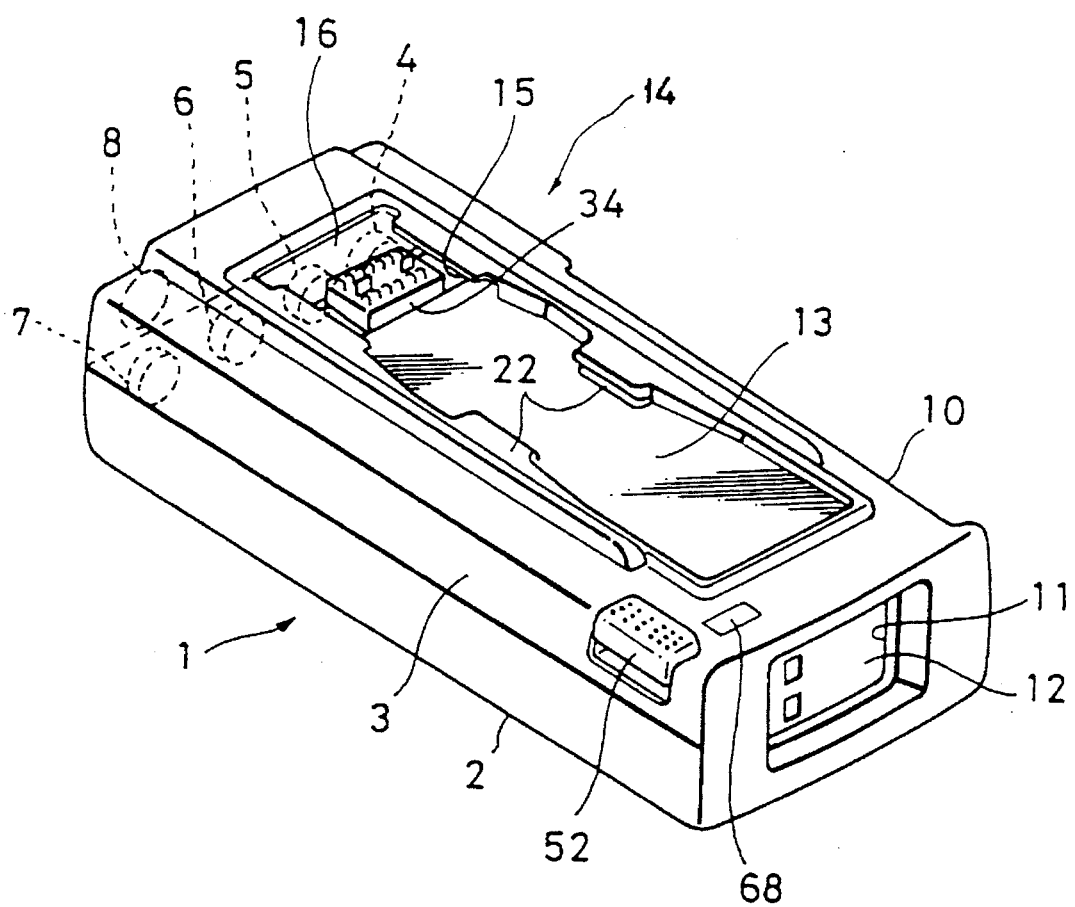
FIG. 5 is a perspective view illustrating an embodiment of a station according to the present invention in which a signal input and output terminal portion thereof are projected.
Figure 6:
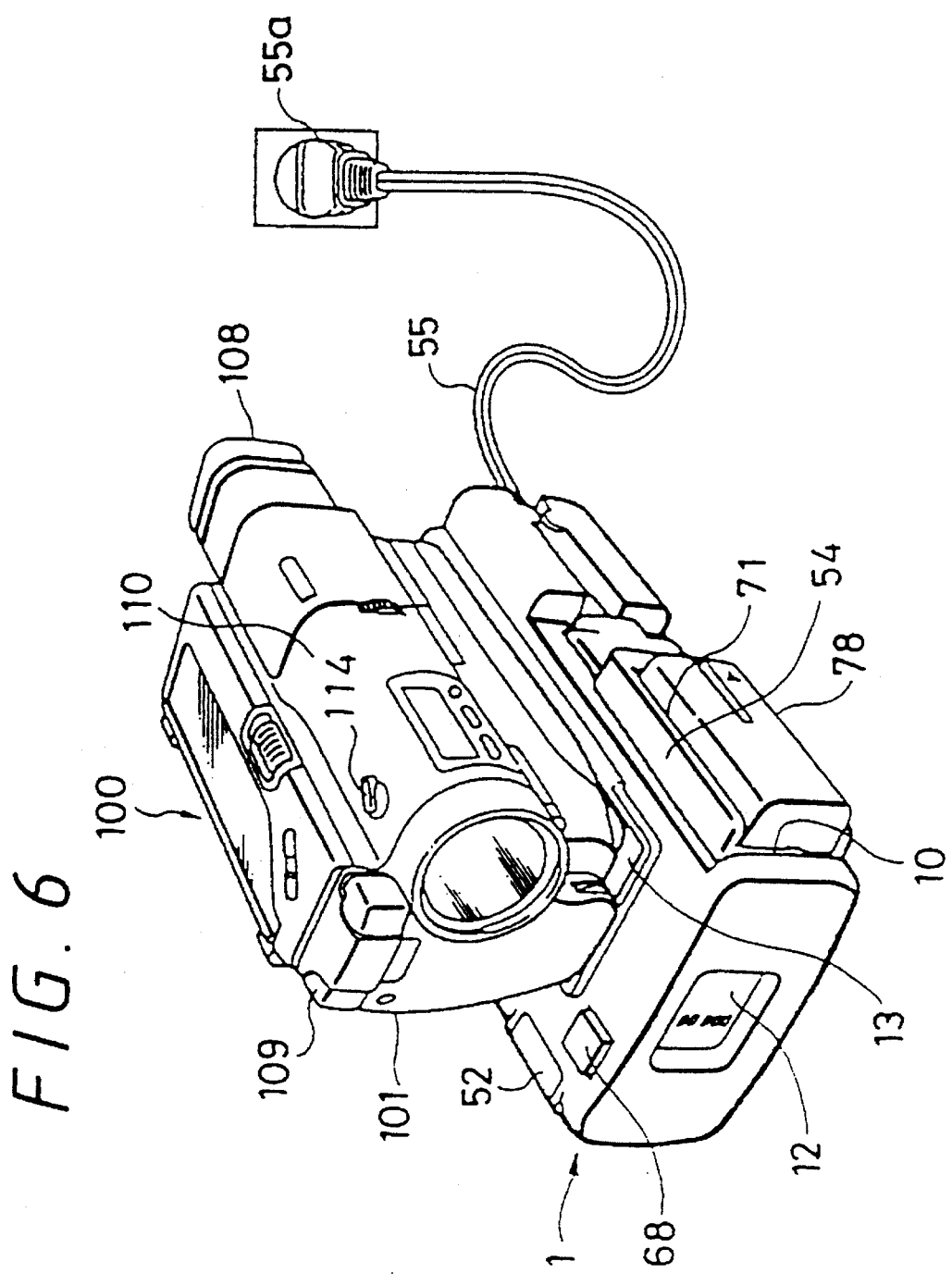
FIG. 6 is a perspective view illustrating the built-in camera type VTR when loaded on the station.
Figure 7:
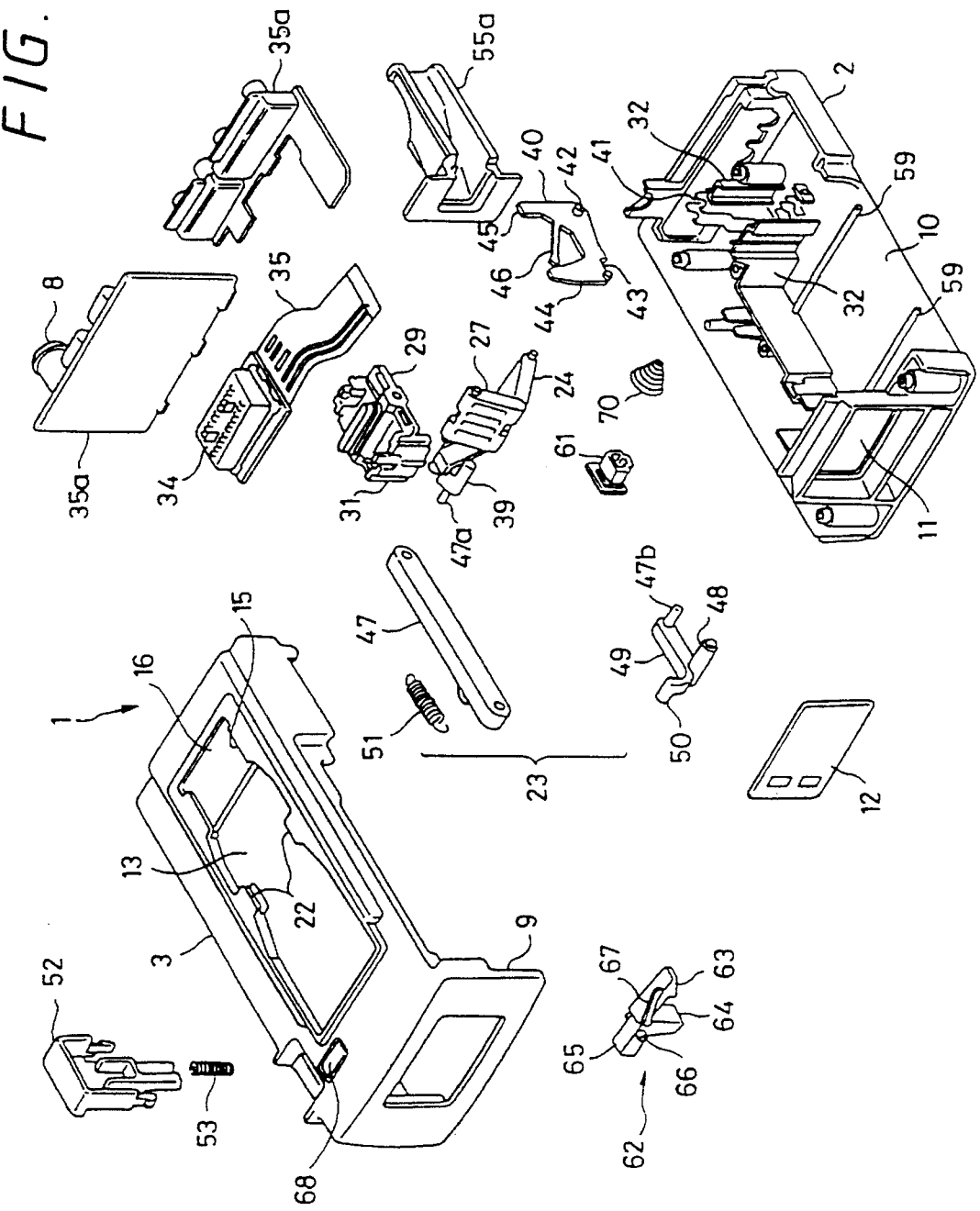
FIG. 7 is an exploded perspective view of the station according to the embodiment of the present invention.

The connecting apparatus (hereinafter referred to as a station) 1 on which the built-in camera type VTR 100 is mounted will be described below. FIG. 5 is a perspective view illustrating an appearance of the station 1 when the shutter member is opened. FIG. 7 is an exploded perspective view of the station 1 shown in FIG. 5.

As shown in FIGS. 5 and 7, the station 1 comprises a plastic lower case 2 and a plastic upper case 3 which are fastened by screws (not shown). The station 1 includes as disposed on its front face near the lower case 2, a video output terminal 4, an audio (monaural) output terminal 5, and audio (stereo) output terminals 6, 7. These output terminals 4 through 7 are connected to other electrical machinery and apparatus, such as an 8-mm VTR, a television receiver, or the like, via exclusively designed cables which are not shown for convenience. The upper case 3 includes a 5 video output terminal 8 disposed on the same face. The video output terminal 8 also is connected to the aforesaid electrical machinery and apparatus by means of an exclusively designed cable (not shown).

As shown in FIG. 7, the station 1 includes an opening portion 9 formed on its one side wall which opening portion 9 is extended over the lower and upper cases 2 and 3. A compartment 10 for an AC adaptor (recharging device), which will be described later, is formed within the station 1 at the opening portion 9. A display portion 12, by which the camera person can visually confirm the recharging state of the AC adaptor, is formed on a window portion 11 formed on the station 1 at its rear surface portion toward which the compartment 10 faces.

The upper case 3 of the station 1 includes a holding surface 13 having a concave surface configuration by which the built-in camera type VTR 100 is held. The holding surface 13 includes a shutter releasing mechanism 14 on its front side.

Figure 8:
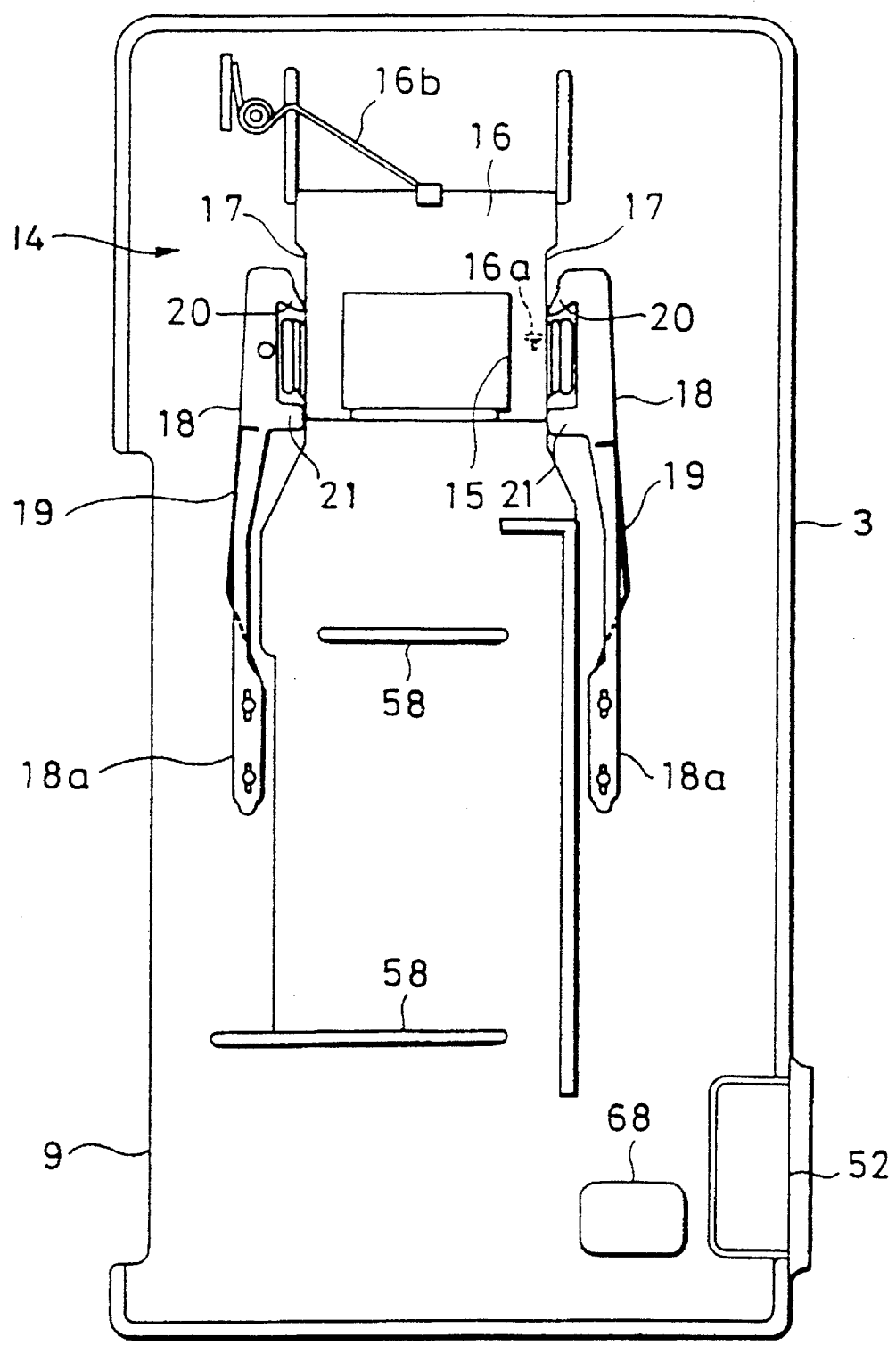
FIG. 8 is a rear view of an upper case of the station, i.e., a plan view of a shutter opening mechanism.
Figure 9:
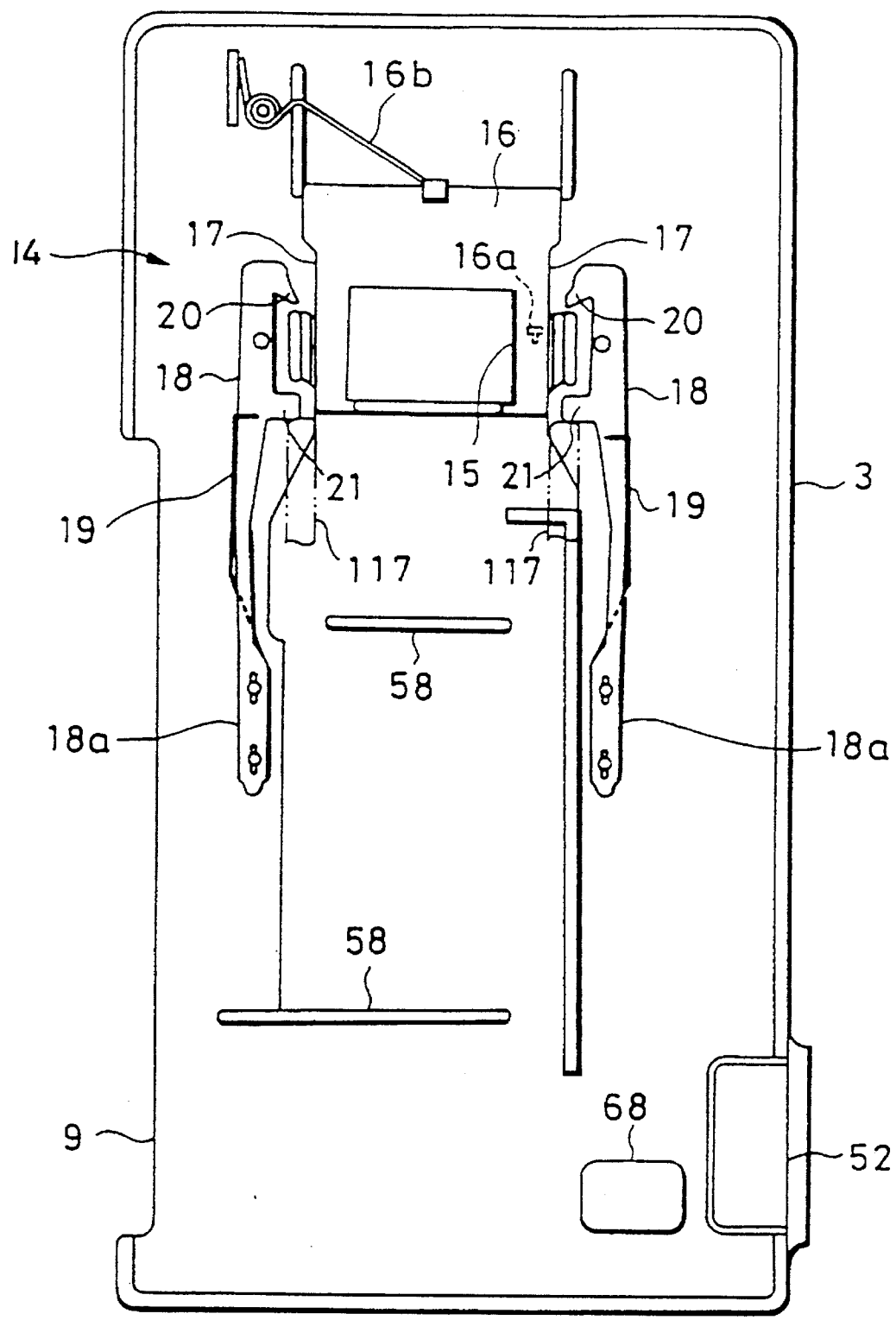
FIG. 9 is a plan view illustrating the shutter opening mechanism shown in FIG. 7 when set in a lock releasing state.
Figure 10:
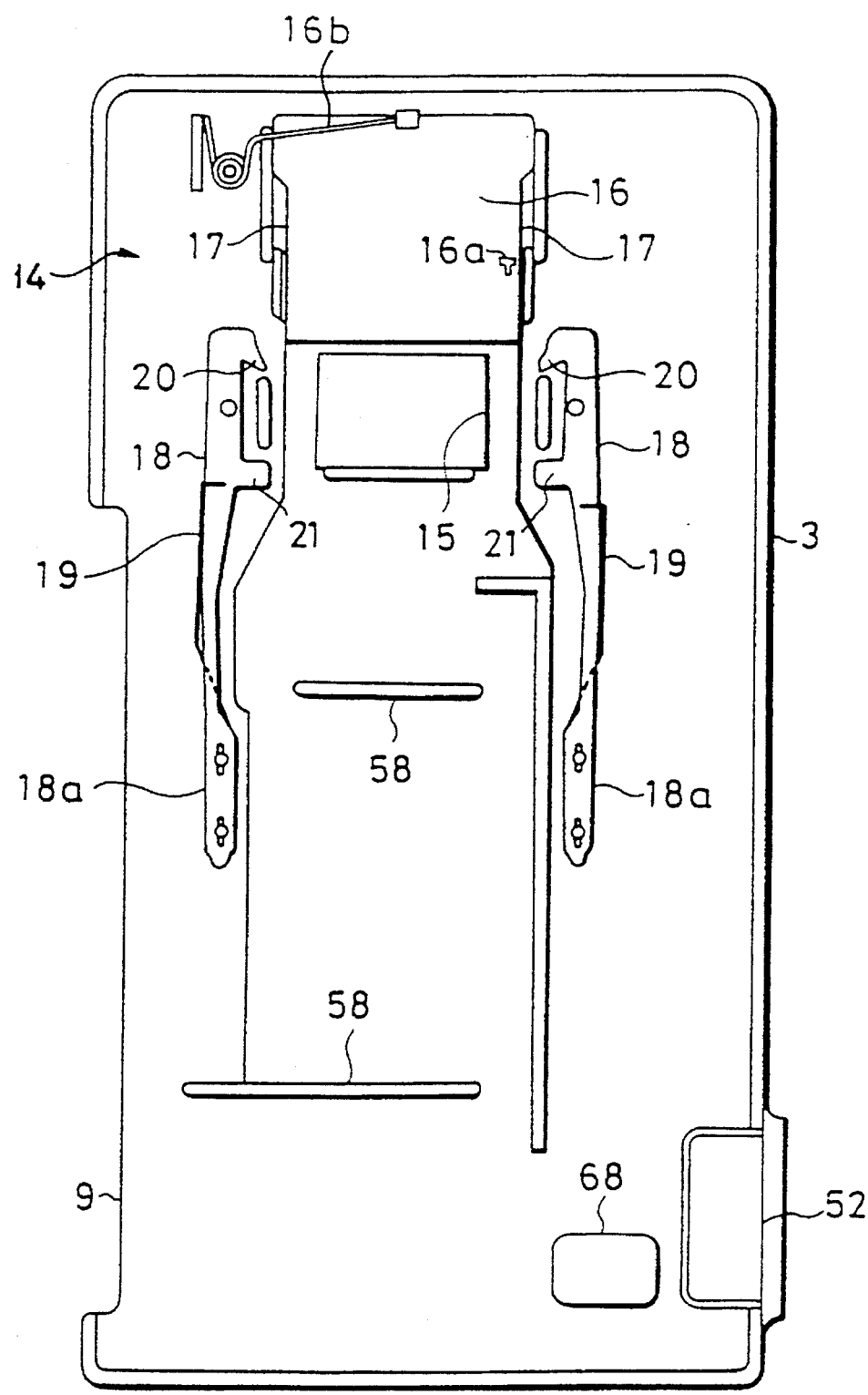
FIG. 10 is a plan view illustrating the condition when the shutter is opened.
Figure 11:
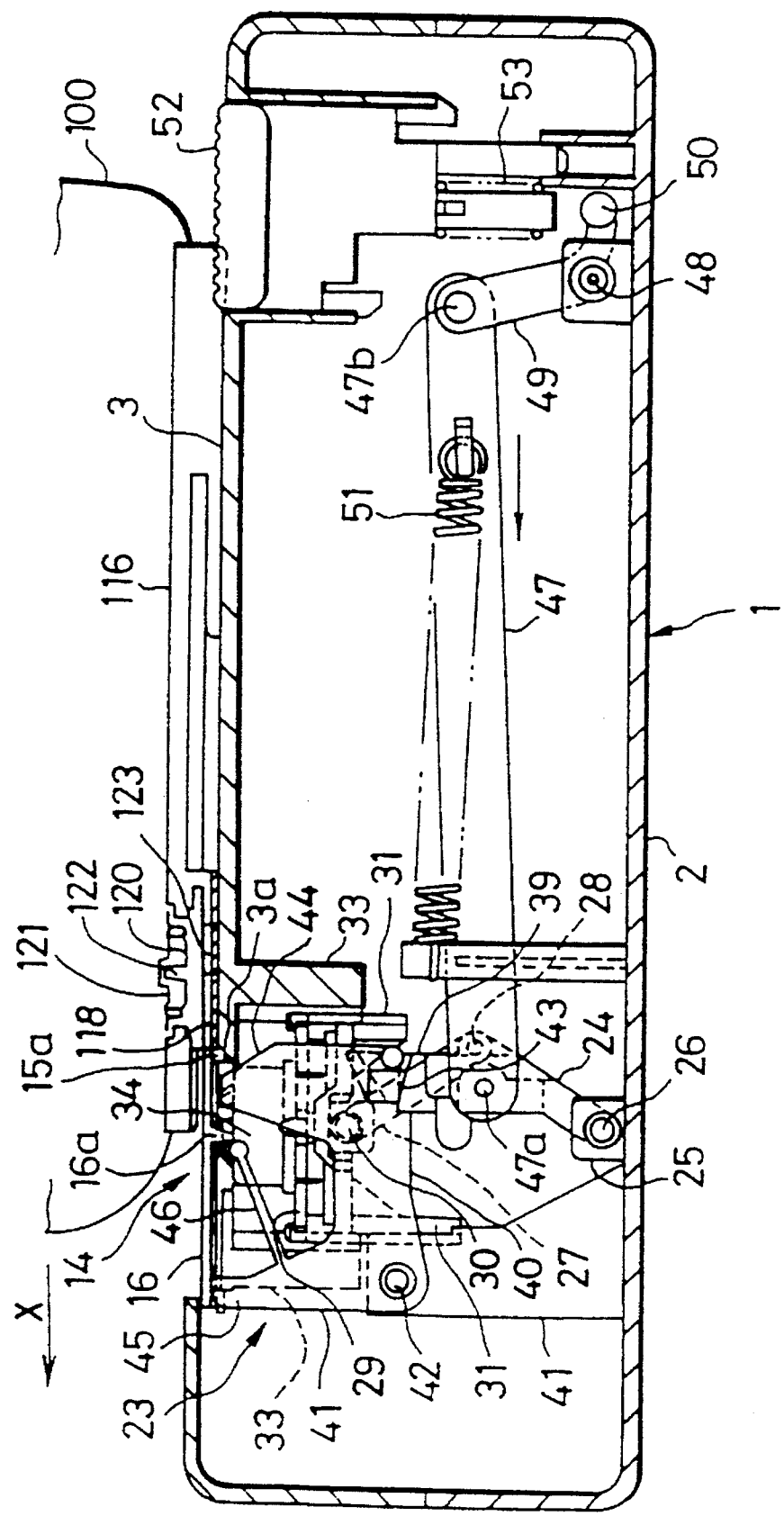
FIG. 11 is a cross-sectional view of the station, i.e, side view of a terminal portion eject mechanism.
Figure 12:
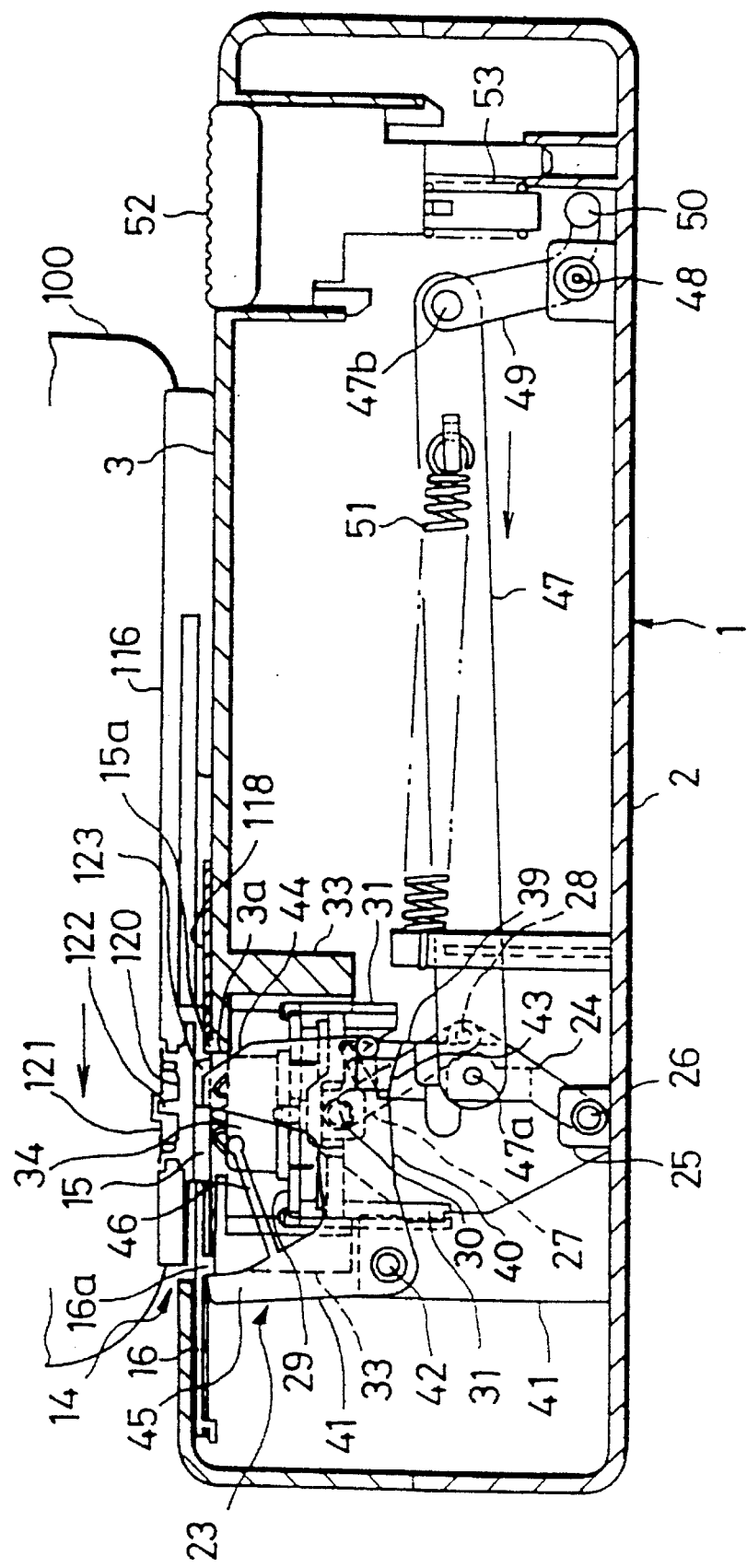
FIG. 12 is a side view of FIG. 10 illustrating the condition when the shutter is opened.
Figure 13:
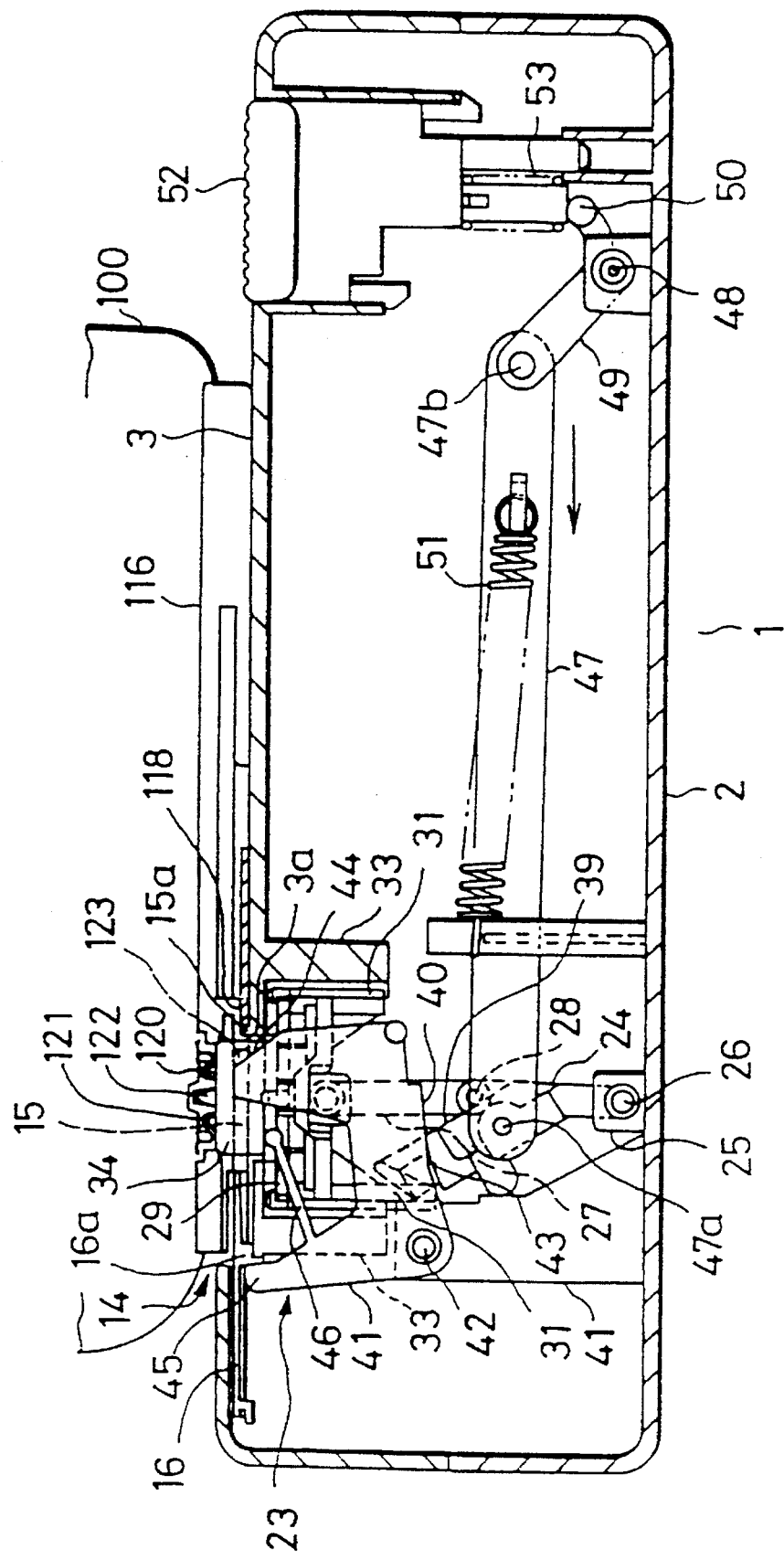
FIG. 13 is a side view illustrating a condition when a terminal portion of the terminal portion eject mechanism is ejected.
Figure 14:
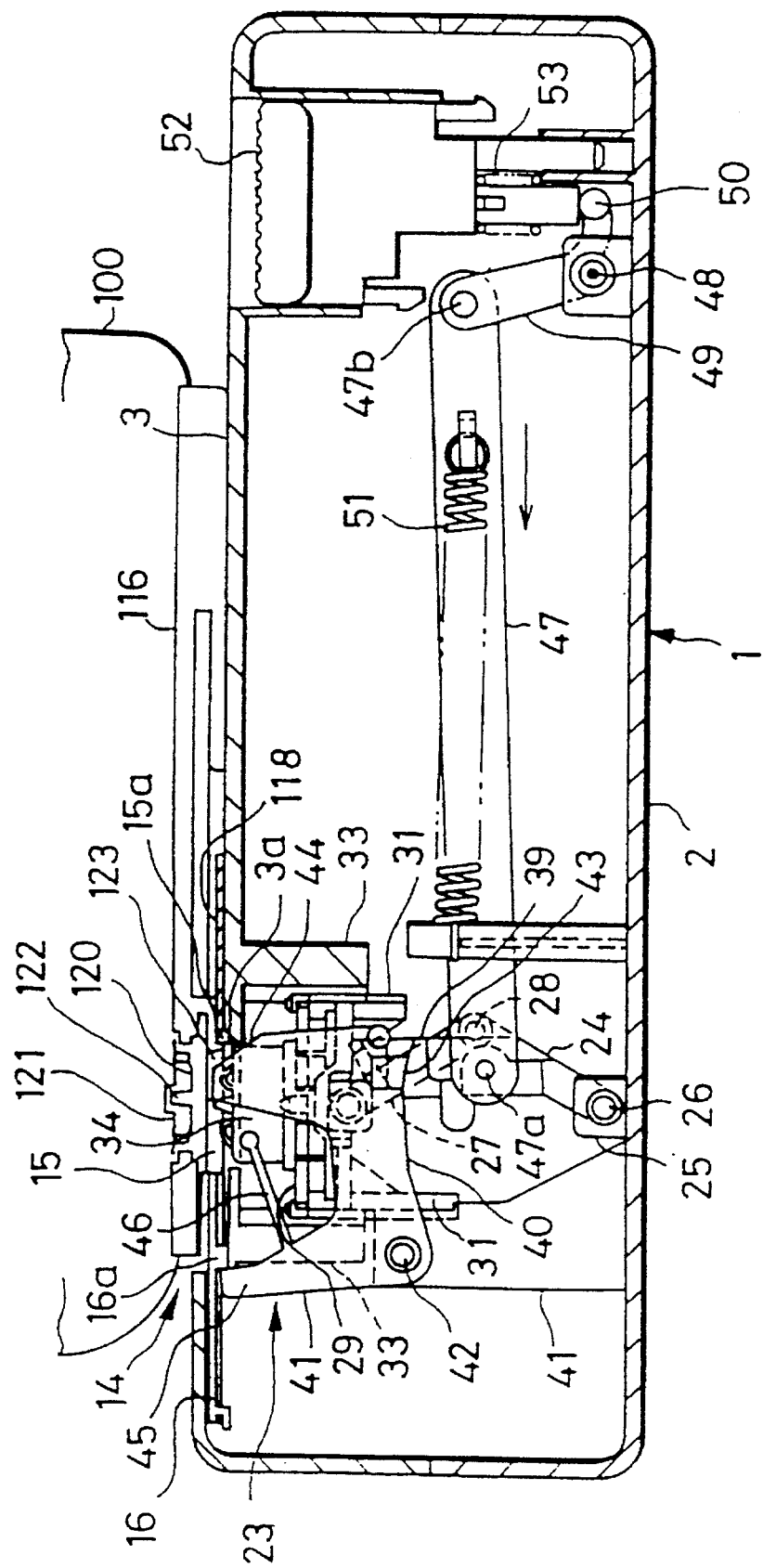
FIG. 14 is a side view illustrating the terminal portion of the terminal portion eject mechanism when released from being locked.

The shutter releasing mechanism 14 will be described with reference to FIGS. 8 to 10. As illustrated, an opening portion 15 is formed through the front side of the holding face 13. The opening portion 15 is freely opened and/or closed by a shutter plate 16 that is slid over the holding face 13. The shutter plate 16 is biased in a direction which tends to close the opening portion 15 under a spring force from a spring member 16*b*. A pair of recess portions 17, 17 are formed at left and right edge portions of the shutter plate 16.

Locking arms 18, 18, whose base ends 18*a*, 18*a* are secured to the rear surface of the upper case 3, are disposed in an opposing relation to the respective side portions of the shutter plate 16. The two locking arms 18, 18 are respectively biased toward the shutter plate 16 under a spring force from spring members 19, 19. Click portions 20, 20 formed at the top portions of the two locking arms 18, 18 are respectively engaged with the recess portions 17, 17 of the shutter plate 16 thereby to hinder the shutter plate 16 from moving. Each of the two locking arms 18, 18 respectively include lock releasing members 21, 21 at its rear side of the click portions 20, 20. As shown in FIG. 5, guide members 22, 22 that can permit the built-in camera type VTR 100 to slide are formed at both side portions of substantially the intermediate portion of the holding face 13.

A terminal portion protruding mechanism 23 is disposed within the station 1 in an opposing relation to the opening portion 15 of the shutter releasing mechanism 14 thus arranged. The terminal portion protruding mechanism 23 will be described with reference to FIG. 7 and FIGS. 11 to 15.

As illustrated, an operation member 24 is pivotally supported at its lower end portion to a bearing plate 25 by a shaft pin 26 provided on the lower case 2. The operation member 24 includes on its upper end a link member 27 pivoted by a shaft pin 28 in substantially a C-letter fashion. A terminal portion attachment washer 29 is supported at the upper end portion of the link member 27 by a shaft pin 30. The terminal portion attachment washer 29 can be swung in the same direction as that of the link member 27. Side plates 31, 31 formed on the front and rear portions of the terminal portion attachment washer 29 can be vertically translated in the upper and lower directions along guide plates 32, 33 formed on the lower case 2 and the upper case 3.

A signal input and output terminal portion 34 of the station 1 is supported at the above-mentioned terminal portion attaching washer 29. This signal input and output terminal portion 34 is electrically connected with a printed circuit board 35*a* through a flexible base plate 35. Since this flexible base plate 35 has a predetermined flexibility, the flexible base plate 35 can stably hold the signal input and output terminal portion 34 when connected with the printed circuit board 35a. Therefore, the lower case 2 and the upper case 3 can be assembled with ease.

Figure 17:
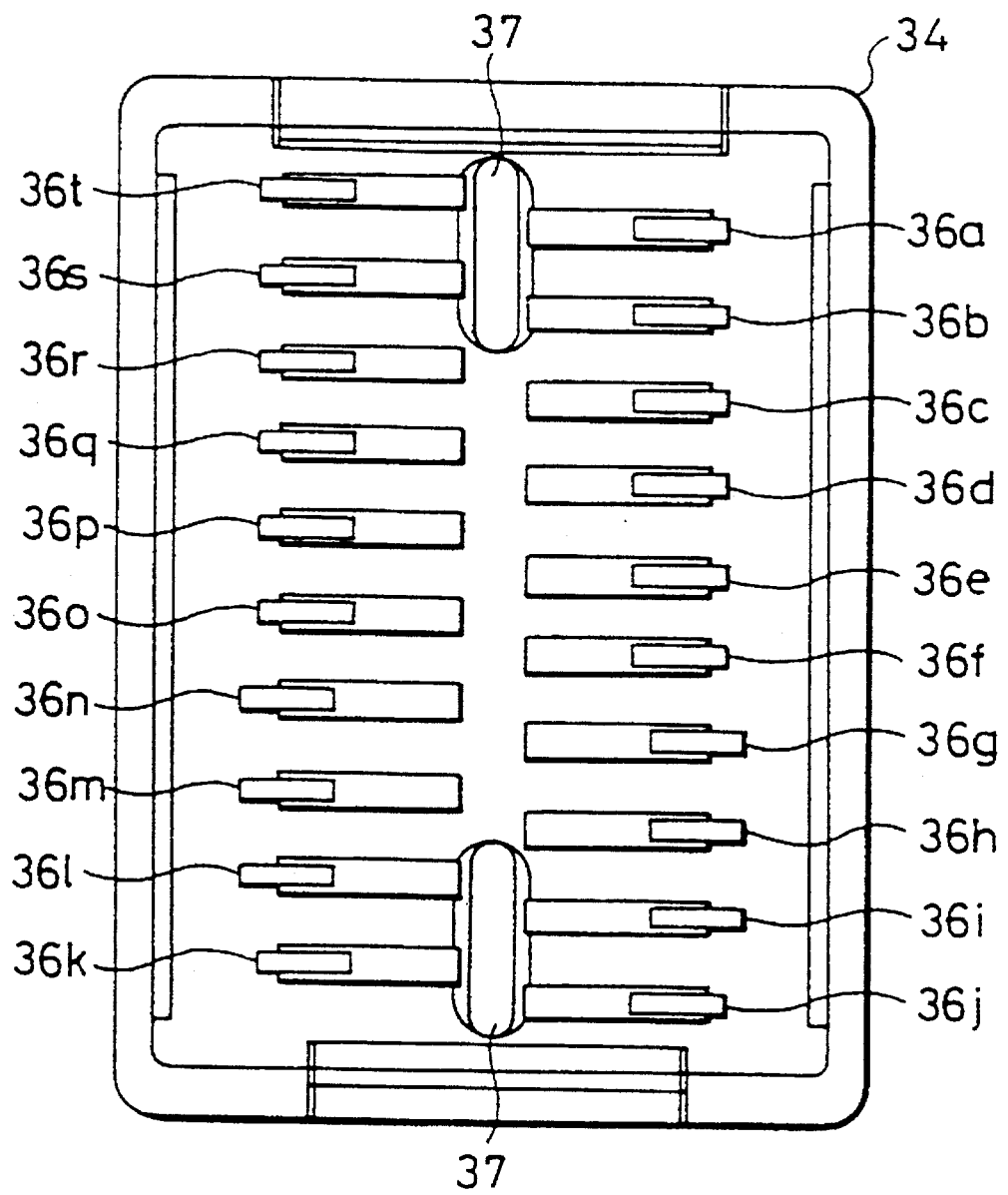
FIG. 17 is a plan view illustrating the signal input and output terminal portion.
Figure 18:
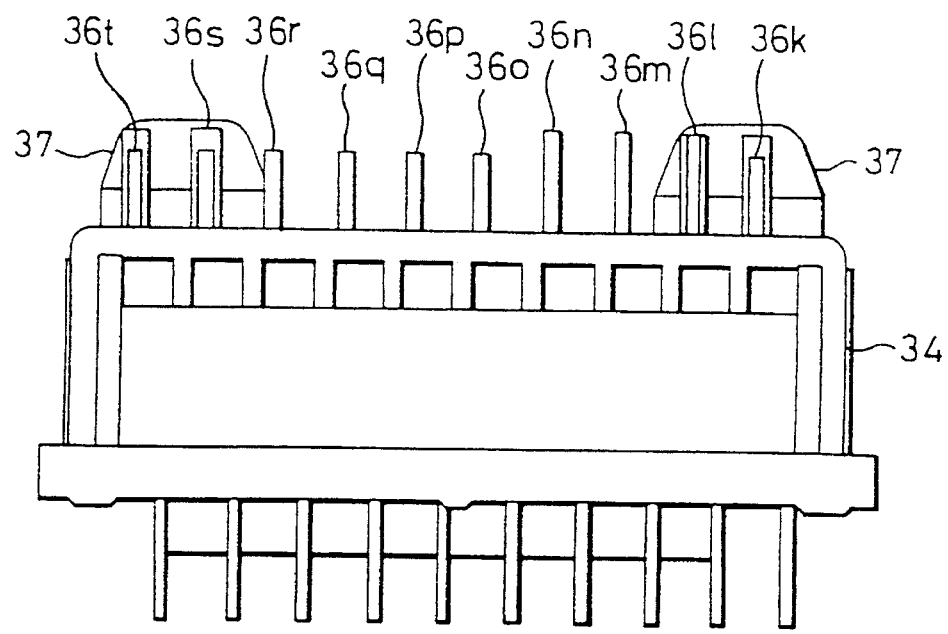
FIG. 18 is a front view of FIG. 17.
Figure 19:
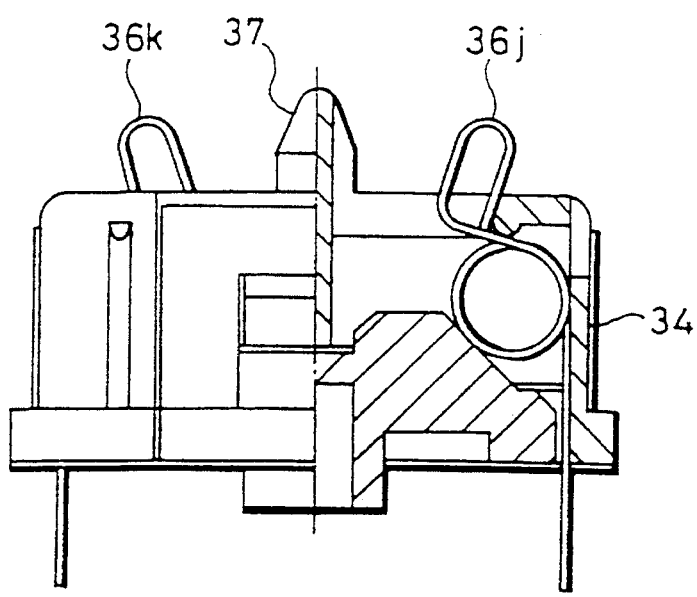
FIG. 19 is a fragmentary cross-sectional side view of FIG. 17.

FIGS. 17 to 19 illustrate the above signal input and output terminal portion 34 in more detail. As illustrated, the signal input and output terminal portion 34 includes two arrays of retractable contact members 36a to 36t, each having a spring function. The above contact members 36a through 36t will be described more fully. The contact member 36a denotes an S terminal (Y, i.e., luminance) output terminal, the contact member 36b denotes an S terminal (color) output, the contact member 36c denotes a VIDEO.OUT, the contact member 36d denotes a VIDEO.GND, the contact member 36e denotes an AUDIO.OUT (R), the contact member 36f denotes an AUDIO.OUT (L), the contact member 36g denotes an AUDIO.GND, the contact member 36h denotes a LANC.SIG (auxiliary), the contact member 36i denotes a LANC.DC (auxiliary), the contact member 36j denotes a LANC.GND (auxiliary), the contact member 36k denotes a MONO (AUDIO) (auxiliary), the contact members 36Q and 36m denote ACV.GND (power supply GND), the contact member 36n denotes a BATT/EXT, the contact member 36o denotes a CHARGE.INH (auxiliary), the contact member 36p denotes an RF.DC.OUT, the contact member 36q denotes a VOLTAGE.CONTROL terminal, the contact members 36r and 36s denote ACV.UNREG (power supply) and the contact member 36t denotes a preliminary terminal.

Of the described contact members 36a to 36t, three of the ACV.GND (power supply GND) of the contact members 36l and 36m and the BATT/EXT of the contact member 36n are protruded to become higher than other contact members as shown in FIG. 18. The reason for this is that, when the signal input and output terminal portion 34 comes in contact with the terminal portion 121 of the built-in camera type VTR 100, the above-mentioned three contact members 36l to 36m are brought in contact with the terminal portion 121 first and then grounded. Therefore, it is possible to solve an electrical problem taking place when other contact members are energized.

If the built-in camera type VTR 100 includes a protecting circuit in order to solve the aforesaid problem, then the height of the three contact members 36l to 36n need not be increased and all contact members 36a to 36t can be formed with the same height.

As shown in FIGS. 17 and 18, a pair of opposed convex members 37, 37 are projected from the central portion of the signal input and output terminal portion 34. The convex members 37, 37 can be engaged with the convex portions 122, 122 of the terminal portion 121 of the built-in camera type VTR 100.

Figure 15:
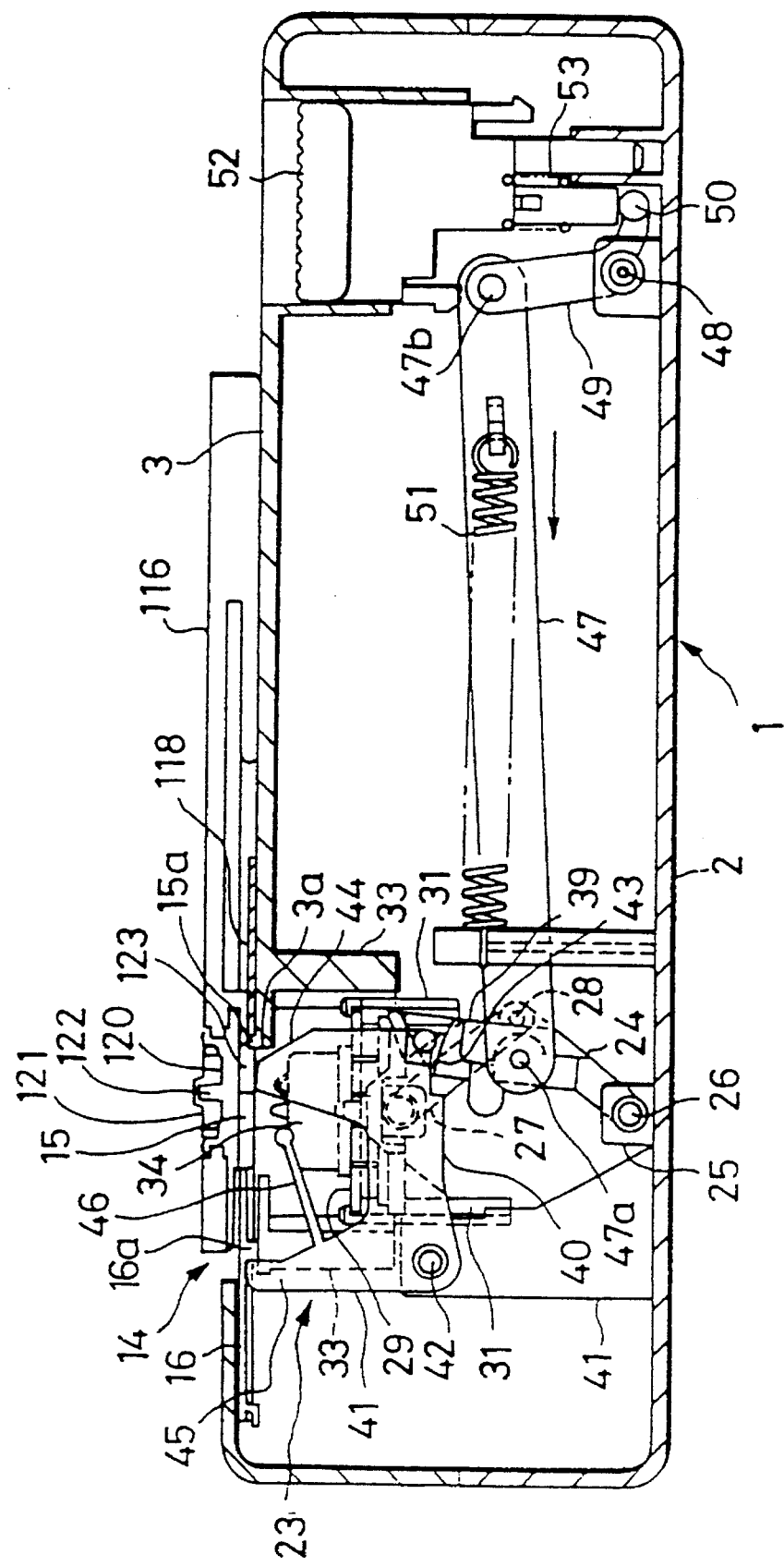
FIG. 15 is a side view illustrating the terminal portion eject mechanism when the station is moved backwardly.
Figure 16:
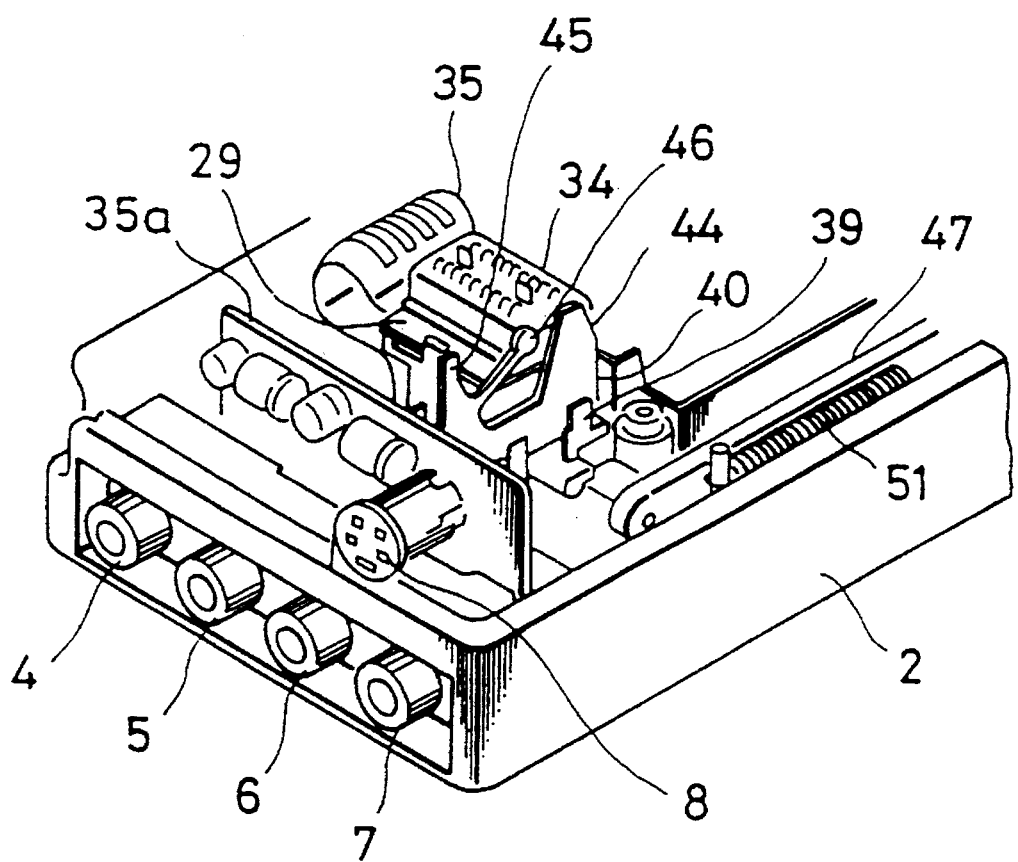
FIG. 16 is a perspective view illustrating the terminal portion eject mechanism.

The above-mentioned operation member 24, as seen in FIGS. 15 and 16, includes a locking operation portion 39 integrally formed thereon to inhibit the signal input and output terminal portion 34 from being projected. The locking operation member 39 permits the signal input and output terminal portion 34 to become retractable in cooperation with a lock releasing member 40. The lock releasing member 40 is pivotable about a shaft pin 42 supported on a bearing plate 41 that is formed on the upper and lower cases 2 and 3. When the locking operation member 39 is engaged with an engagement portion 43 formed on the lower surface of the lock releasing member 40, the locked condition of the signal input and output terminal portion 34 can be maintained.

The above lock releasing member 40 includes at its rear upper portion a locking piece member 44 and a lock releasing piece member 45 to lock and unlock the built-in type VTR held on the station 1. The locking piece member 44 can be inserted into and extracted from a slit 3a bored through the upper surface portion of the upper case 3. The lock releasing piece member 45 comes in contact with an operation protrusion 16a formed at the rear surface of the shutter plate 16 in use. A resilient member 46 that is integrally formed with the lock releasing member 40 is brought in contact with the rear surface of the upper case 3 so that the lock releasing member 40 is biased downwardly under a spring force of the resilient member 46.

One end of a link bar 47 is pivotally supported by a pin 47a to a side surface of the locking operation portion 39 of the operation member 24. The other end of the link bar 47 is pivotally supported by a pin 47b to one end of a pivotable operating member 49 that is supported on the lower case 2 by a supporting shaft 48 so as to become rotatable about the supporting shaft 48. The other end portion of the operating member 49 serves as an operating member 50. The link bar 47 is biased in the direction shown by an arrow x in FIG. 11 by a coil spring member 51 extended between it and the lower case 2. That is, the signal input and output terminal portion 34 is biased in a direction so that it is ejected from the opening portion 15 of the upper case 3 under a spring force of the coil spring member 51.

An operating button 52 that is used to move the signal input and output terminal portion 34 back into the opening portion 15 of the upper case 3 is retractably provided on the upper case 3 by means of a spring member 53.

In operation, the built-in camera type VTR 100 is loaded onto the station 1 thus constructed as will be described with reference to FIGS. 5 and 8 to 10.

The respective output terminals 4 to 7 of the station 1 are connected in advance to other electrical machinery and apparatus such as a television receiver, a VTR, and the like, though not particularly shown. When so connected under this condition, the built-in camera type VTR 100 is loaded onto the station 1 such that the top portions of the guide rails 117, 117 (FIG. 3) of the supporting plate 116 formed on the bottom portion thereof are opposed to the shutter plate 16 of the holding portion 13 of the station 1 (see FIG. 11). Then, when the built-in camera type VTR 100 is slid in the arrow X direction under the condition that groove portions (not shown) formed on respective side portions of the supporting plate 116 are engaged with guide members 22, 22 formed on both sides of the holding portion 13, the lock releasing members 21, 21 of the locking arms 18, 18 are returned outwardly against the spring force of the spring members 19, 19 by the outer edge top portions of the guide rails 117, 117, whereby the locking arms 18, 18 are resiliently deformed outwardly, causing the click portions 20, 20 to be released from the recess portions 17, 17 of the shutter plate 16. Thus, the shutter plate 16 is released from being locked (see FIG. 9).

Immediately after the shutter plate 16 is released from being locked, the shutter plate 16 is pushed by the top portions of the guide rails 117; 117 of the above-mentioned supporting plate 116 against the spring force of the spring member 16b and then slid so that the opening portion 15 on the station 1 side is being opened. At that time, since the shutter plate 118 of the supporting plate 116 is brought at its tip end in contact with a convex or depressed portion 15a (see FIG. 11) formed around the opening edge of the above-mentioned opening portion 15, the shutter plate 118 is not moved even when the supporting plate 116 is advanced, thus causing the opening window 119 of the supporting plate 116 to be progressively opened.

When the supporting plate 116 of the built-in camera type VTR 100 reaches a predetermined stop position, the opening portion 15 that had been closed by the shutter plate 16 of the station 1 is completely opened. Also, the opening window 119 that had been closed by the shutter plate 118 of the built-in camera type VTR 100 is completely opened, whereby the opening portion 15 of the station 1 and the opening window 119 of the built-in camera type VTR 100 become coincident with each other in their opening states (see FIGS. 10 and 12).

At substantially the same time that the opening portion 15 and the opening window 19 are opened according to the foregoing operation,, the operation protrusion 16a formed at the rear surface of the shutter plate 16 comes in contact with the lock releasing piece member 45 of the lock releasing member 40 and pushes the latter backwardly. Consequently, the lock releasing member 40 is rotated about the shaft pin 42 in the counter-clockwise direction in FIG. 12, whereby the engagement portion 43 is detached from the lock operation portion 39 of the operation member 24. Therefore, the operation member 24 is rotated about the shaft pin 26 in the counter-clockwise direction under a spring force of the coil spring 51 that spring-biases the link bar 47. Consequently, the operation member 24 is raised substantially vertically.

Accordingly, since the link member 27 coupled to the above-mentioned operation member 24 also is raised, the signal input and output terminal portion 34 that is supported to the upper end of the link member 27 through the terminal portion attachment washer 29 is moved upwardly and then projected from the opening portion 15 of the station 1, thereby being electrically connected to the terminal portion 121 of the built-in camera type VTR 100. Further, the signal input and output terminal portion 34 and the terminal portion 121 are mechanically coupled to each other when the convex portion 37 projected from the signal input and output portion 34 is engaged with the concave portion 122 formed on the terminal portion 121 (see FIG. 13).

At substantially the same time the signal input and output portion 34 and the terminal portion 121 of the built-in camera type VTR 100 are connected to each other, the locking piece member 44 of the operation member 24 is projected from the slit 3a and engages with the recess 123 formed on the supporting plate 116 of the built-in camera type VTR 100, whereby the built-in camera type VTR 100 is fixedly held on the station 1.

The built-in camera type VTR 100 is disconnected from the station 1 as follows. When the operating button 52 is depressed from the state shown in FIG. 13, the operation piece member 50 of the operation member 49 is pushed downwardly to cause the operation member 49 to rotate about the supporting shaft 48 in a clockwise direction. Consequently, the link bar 47 is returned against the spring force of the coil spring 51 to cause the operation member 24 to be rotated in the clockwise direction, moving the link member 27 downwardly. Therefore, the signal input and output terminal portion 34 is lowered through the terminal portion attachment washer 29 and accommodated within the opening portion 15, thereby releasing the electrical connection between the signal input and output terminal portion 34 and the terminal portion 121 of the station 1. Concurrently with this operation, the lock operation member 39 is engaged with the engagement portion 43 of the lock releasing member 40 so that the signal input and output terminal portion 34 can be locked by the lock operation portion 39 under the condition that the signal input and output terminal portion 34 is lowered (see FIG. 14).

Further, concurrently with the above-mentioned operation, the lock releasing member 40 is rotated about the shaft pin 42 in the clockwise direction, whereby the locking piece member 44 is ejected from the recess 123 of the supporting plate 116 on side of the station I and released from being locked. Further, concurrently with this operation, the lock releasing piece member 45 pushes the operation protrusion 16a of the shutter plate 16, whereby the shutter plate 16 is slid a little in the closing direction. Therefore, the guide rails 117, 117 of the built-in camera type VTR 100 is moved backwardly by a distance corresponding to the sliding distance of the shutter plate 16 so that the built-in camera type VTR 100 can be removed from the station 1 with ease (see FIG. 15).

The AC adaptor (charger) 54 that is accommodated within the adaptor compartment 10 of the station 1 will be described below.

Figure 20:
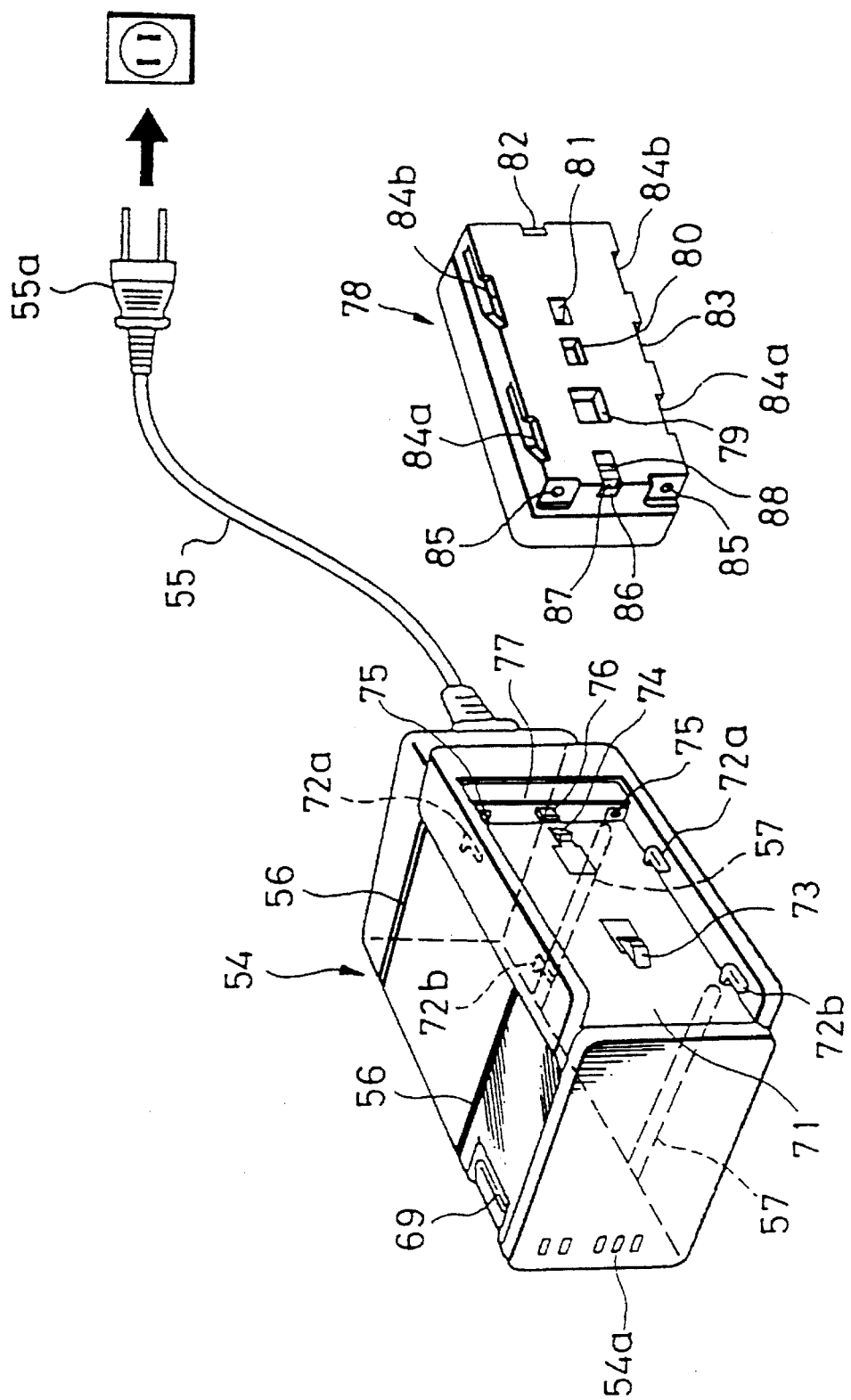
FIG. 20 is a perspective view of an AC adaptor and a battery pack.

As shown in FIG. 20, there is provided an AC adaptor that is generally depicted by a reference numeral 54. The AC adaptor 54 includes a power supply connecting cord 55. Two parallel guide protrusions 56, 56 are formed on an upper surface of the AC adaptor 54 and two parallel concave slits 57, 57 are formed on the rear surface thereof. When the AC adaptor 54 is being accommodated into the adaptor compartment 10, the guide protrusions 56, 56 are guided by two parallel guide portions 58, 58 formed on the ceiling surface of the adaptor compartment 10, i.e., the rear surface of the upper case 3 (see FIG. 8) and also guided by two parallel protruded portions 59, 59 formed on the bottom surface of the adaptor compartment 10, i.e., the rear surface of the lower case 2 (see FIG. 7), whereby the AC adaptor 54 can be accurately accommodated into the adaptor compartment 10. Further, when the AC adaptor 54 is accommodated within the adaptor compartment 10, the cord 55 is led out to the outside through a cord guide member supported by the upper and lower cases 2 and 3.

Figure 23:
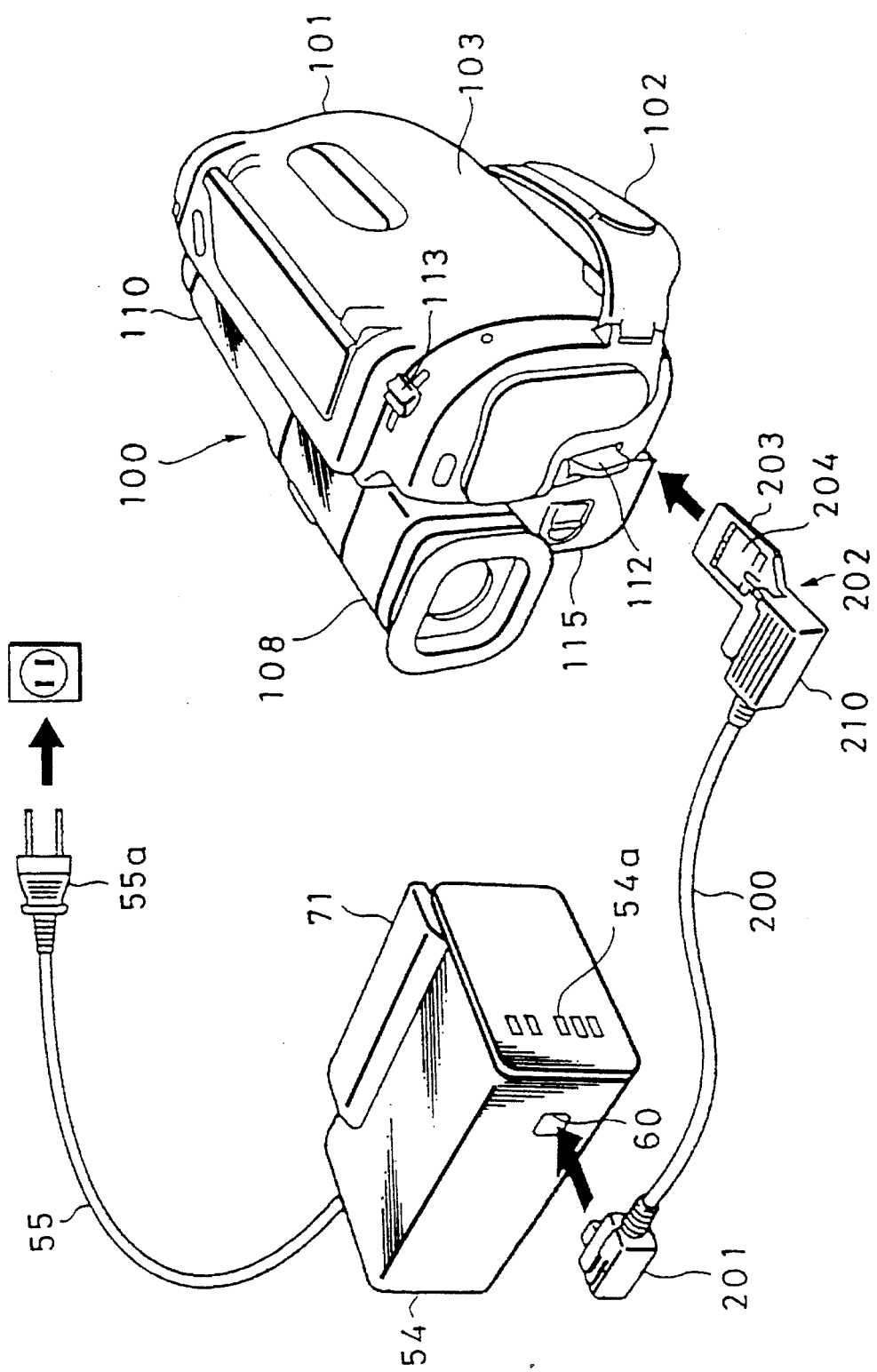
FIG. 23 is a perspective view used to explain the condition when a connection cord is in use.
Figure 24:
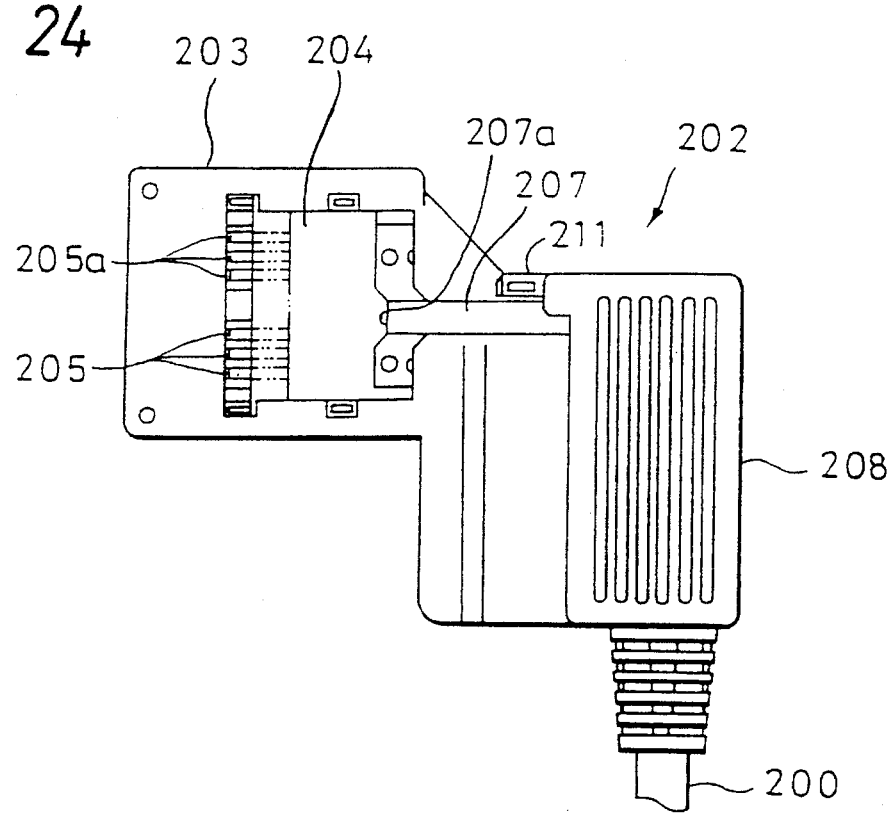
FIG. 24 is a bottom view of a connection case of the connection cord.
Figure 25:
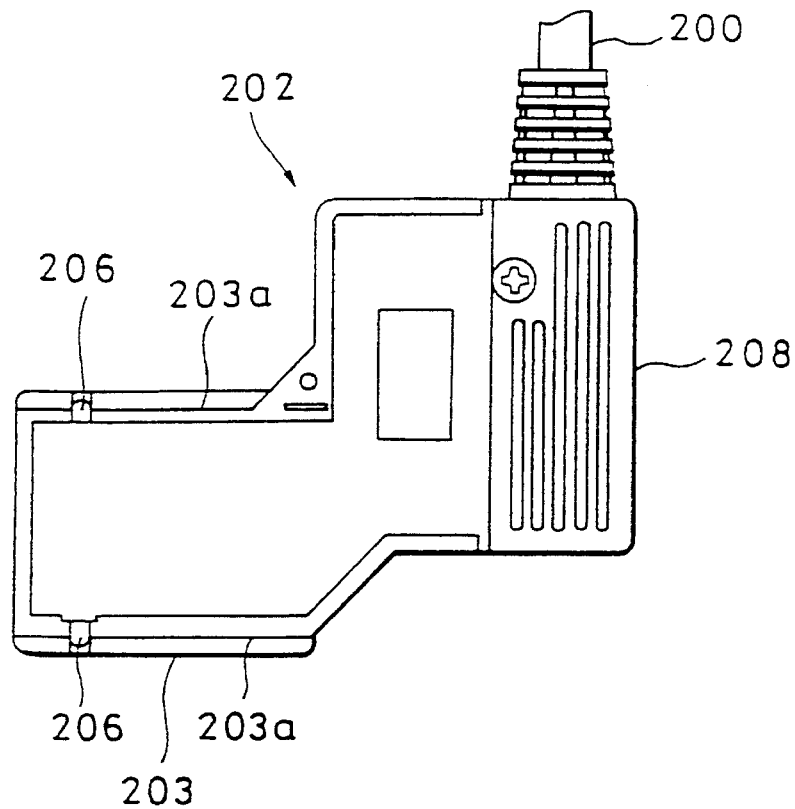
FIG. 25 is a plan view of the connection case.
Figure 26:
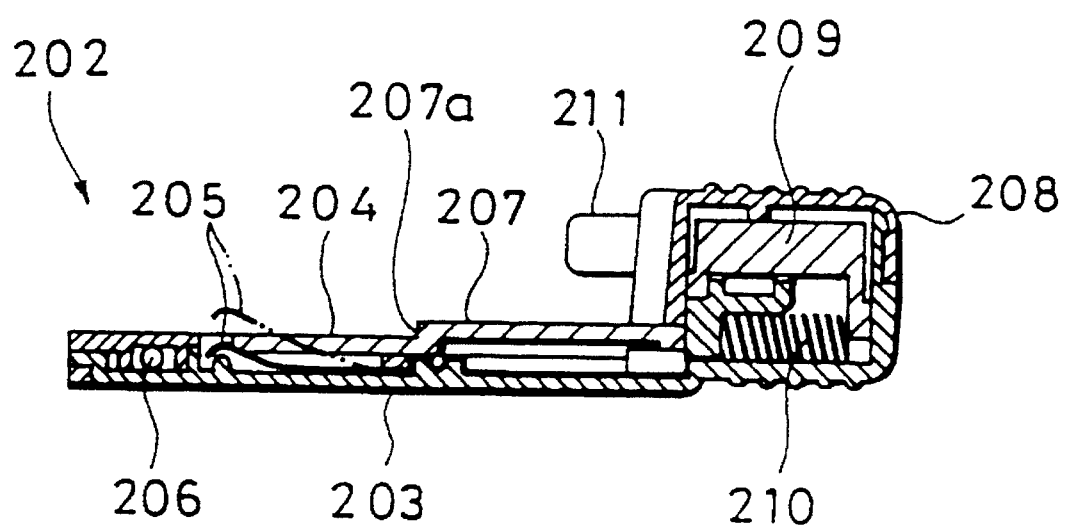
FIG. 26 is a cross-sectional view of the connection case.

The AC adaptor 54 includes a DC output terminal 60 formed on its rear surface (see FIG. 23). When the AC adaptor 54 is accommodated into the adaptor compartment 10, the DC output terminal 60 is electrically connected with the signal input and output terminal portion 34 and then connected to a connector 61 supported to the lower case 2 (see FIG. 7). The connector 61 is loosely supported to the lower case 2 and the top portion of the connector 61 is formed as a tapered face so that, even when the AC adaptor 54 is displaced slightly in position within the adaptor compartment 10, the AC adaptor is guided by this tapered face and the DC output terminal 60 and the connector 61 can be connected with ease. The AC adaptor 54 includes a charging lamp portion 54a formed on a side wall at the adaptor to enable the user to visually confirm a variety of charging conditions of the AC adaptor 54. The user can see the charging lamp portion 54a through the display portion 12.

Figure 21:
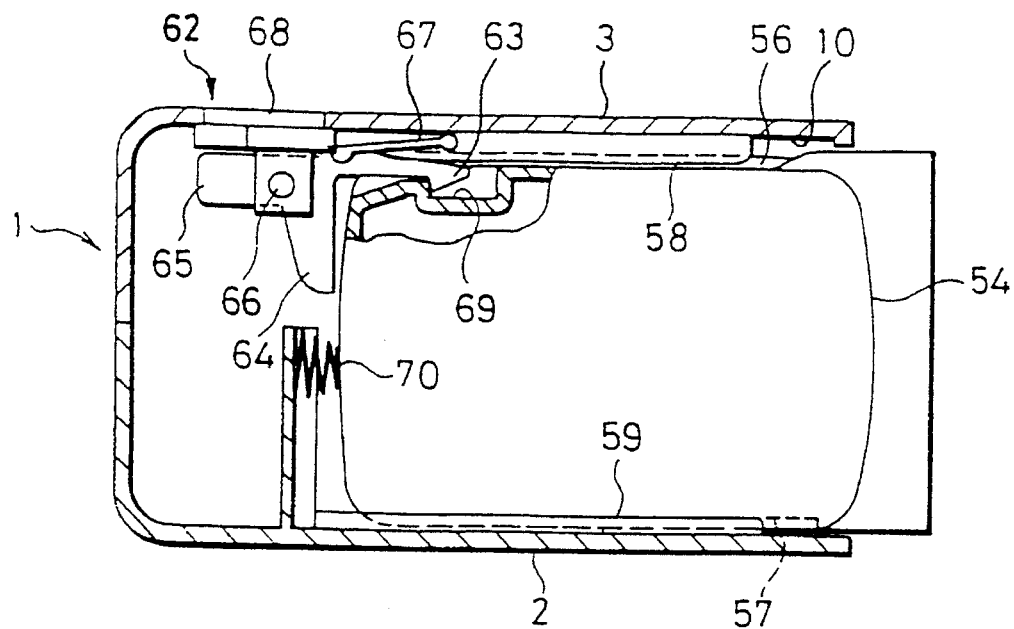
FIG. 21 is a cross-sectional view illustrating the station under the condition that the AC adaptor is locked.
Figure 22:
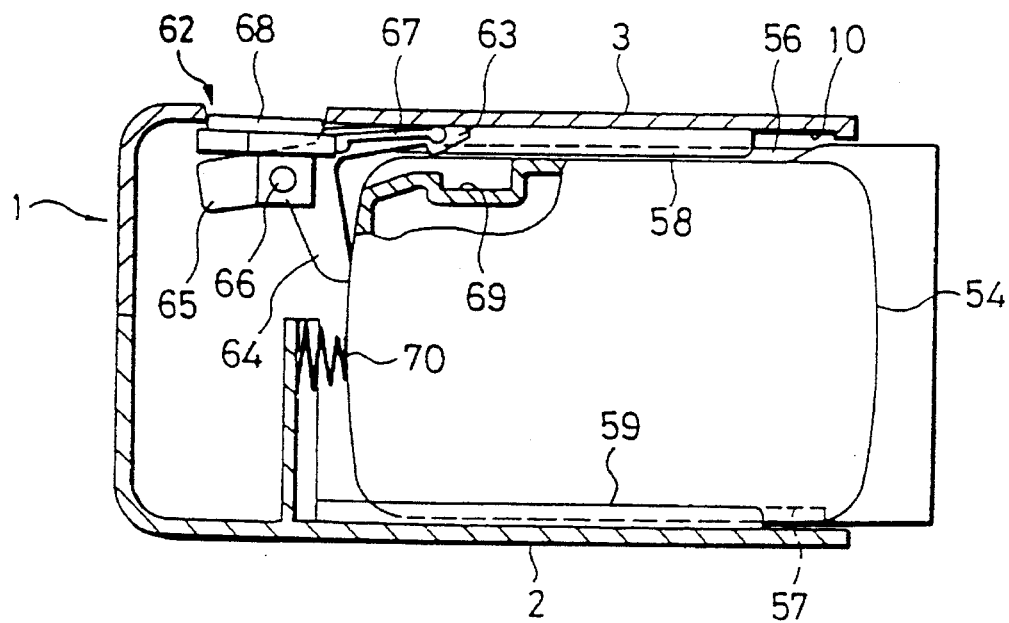
FIG. 22 is a cross-sectional view illustrating the station under the condition that the AC adaptor is released from being locked.

The upper case 3 includes a locking and unlocking mechanism 62 for locking and unlocking the AC adaptor 54 when that the AC adaptor 54 is accommodated within the adaptor compartment 10. The locking and unlocking mechanism 62 will be described with reference to FIGS. 21 and 22. As illustrated, the locking and unlocking mechanism 62 includes a locking ratchet member 63, a lock releasing lever 64 formed at a right angle with respect to the locking ratchet member 63 and an operation lever 65 formed on an extension of the locking ratchet member 63. The locking and unlocking mechanism 62 can be rotated about a shaft 66 and returned with resiliency to the original position by a resilient member 67 integrally formed with the locking and unlocking mechanism 62. A lock releasing button 68 is provided on the upper case 3 in association with the operation lever 65.

With the locking and unlocking mechanism 62 thus constructed, when the AC adaptor 54 is accommodated into the adaptor compartment 10, the locking ratchet member 63 is engaged with an engagement concave or recessed portion 69 formed on the upper corner portion of the AC adaptor 54; thereby the AC adaptor 54 is locked in the adaptor compartment 10. When the lock releasing button 68 is depressed under the condition that the AC adaptor 54 is locked, the locking ratchet member 63 is moved backwardly via the operation lever 65 and then detached from the engagement concave portion 69 of the AC adaptor 54. Simultaneously, the lock releasing lever 64 pushes the front wall of the AC adaptor 54 to release the AC adaptor 54 from being locked. Then, the AC adaptor 54 is ejected to the outside of the adaptor compartment 10 by a coil spring 70 attached to the lower case 2.

The AC adaptor 54 includes on its rear surface a battery connecting portion 71 of a concave or recessed configuration, one end of which is opened to connect a battery pack which will be described later with the structure as shown in FIG. 20. The battery connecting portion 71 includes pairs of lock ratcheting portions 72a, 72a and 72b, 72b formed on the left and right inner surfaces thereof. Also, the battery connecting portion 71 includes at its front and rear portions of the central portion of the bottom portion thereof a retaining protrusion 73 and an engagement portion 74, each being made flexible in the vertical direction. The battery connecting portion 71 includes at its front end portion a pair of terminal pins 75, 75 and an operation protrusion 76 at an intermediate portion therebetween. The two terminal pins 75, 75 and the operation protrusion 76 are covered with a shutter member 77 that is biased under a spring force.

As shown in FIG. 20, a battery pack is provided, generally denoted by reference numeral 78, that is connected to the battery connecting portion 71. The battery pack 78 can be connected to the battery connecting portion 71 when slid in the forward direction with respect to the battery connecting portion 71. Also, the battery pack 78 can be removed from the battery connecting portion 71 when slid backwardly. Concave or recessed or aperture portions 79, 80, 81, and 82 are formed at the central portion of the bottom portion of the battery pack 78, and a concave portion 83 is formed along one side portion of the battery pack 78. The concave portions 79, 80, 83 are detection apertures and the concave portions 81, 82 are locking apertures, respectively.

It is detected by the detection apertures 79, 80, 83 whether or not the battery pack 78 and the AC adaptor 54 are properly connected to each other. The battery pack 78 that is connected to the AC adaptor 54 is maintained in that position by the locking apertures 81, 82, and the locking aperture 81 is engaged with the retaining protrusion 73 of the above AC adaptor 54.

Pairs of engagement apertures 84a, 84a and 84b, 84b, each having ribs are respectively formed on the left and right side portions of the battery pack 78. When the battery pack 78 is connected to the AC adaptor 54, the engagement apertures 84a, 84a and 84b, 84b are respectively engaged with the locking ratchet portions 72a, 72a and 72b, 72b to lock the battery pack 78.

The battery pack 78 includes a pair of left and right aperture-shaped electrodes 85, 85 formed through the front end portion. These electrodes 85, 85 are respectively connected to the mating terminal pins 75, 75 of the AC adaptor 54 and function as charging electrodes of the battery pack 78. The electrodes 85, 85 also function as power supply electrodes when the battery pack 78 is loaded on the built-in camera type VTR 100 to power the same.

The described detection apertures 79, 80 can easily detect whether or not the battery pack 78 and the AC adaptor 54 are properly connected to each other because the battery pack 78 is considerably inclined by a protrusion (not shown) formed on the AC adaptor 54 when the battery pack 78 is not properly connected to the AC adaptor 54.

The battery pack 78 includes a marker 86 formed at the central front end portion thereof. This marker 86 is adapted to function to determine whether or not the battery pack 78 had already been charged or whether or not the battery pack 78 had been used. The marker 86 in this embodiment is slidably disposed within a concave or recessed portion 87 and formed of a slider 88 having a protrusion (not shown) formed at the top portion thereof.

When the battery pack 78 had been charged, the marker 86 is projected into the concave portion 87. When the battery pack 78 is in use or its use has been finished, the marker 86 is returned into the battery pack 78 and projected slightly. When the battery pack 78 is pulled out from the AC adaptor 54 after the battery pack 78 had been connected to and charged by the AC adaptor 54, the protrusion 88a of the marker 86 comes in contact with the engagement member 74 of the AC adaptor 54 to withdraw the slider 88 so that the slider 88 is projected. Therefore, the user can visually confirm the charged state of the battery pack 78 from the projection of the marker. Meanwhile, when the battery pack 78 is accommodated into a battery compartment 115 of the built-in camera type VTR 100 (see FIG. 23), the protrusion of the marker 86 is pushed back by a member which is not shown. Thus, when the battery pack 78 is taken from the battery compartment 115, the user can visually confirm that the battery pack 78 had been in use.

According to the aforesaid marker 86, especially if the surface of the slider 88 and the surface of the concave portion 87 display different colors, then it can be recognized by the contrasting colors whether the battery pack 78 is being charged or had been in use.

According to the thus arranged connecting apparatus for a built-in camera type VTR of the present invention, when a picture taken by the built-in camera type VTR 100 is recorded, reproduced and transposed in a dubbing fashion by the television receiver or VTR, the respective output terminals 4 through 7 of the station 1 are connected to the television receiver or VTR by means of exclusively-designed cables. Then, the AC adaptor 54 is accommodated within the adaptor compartment 10 of the station 1 and a plug socket 55a of the cord 55 of the AC adaptor 54 is connected to the power supply. In this state, the built-in camera type VTR 100 is loaded on the holding face 13 of the station 1 and the signal input and output terminal portion 34 of the station 1 and the terminal portion 121 of the built-in camera type VTR 100 are electrically connected to each other by the above-mentioned connection mechanism, whereby the picture taken by the built-in camera type VTR 100 can be recorded, reproduced or transposed in a dubbing mode. In this case, the battery pack 78 need not be accommodated into the battery compartment 115 of the built-in camera type VTR 100.

When the camera person takes a picture by the built-in camera type VTR 100, the battery pack 78 is accommodated within the battery compartment 115 of the built-in camera type VTR 100 so that the battery pack 78 serves the power supply of the built-in camera type VTR 100.

Further, the built-in camera type VTR 100 can be driven by AC power as its power supply when in use. In this case, the terminal portion 121 of the built-in camera type VTR 100 and the AC adaptor 54 must be connected to each other by means of an exclusively designed connection cord. This connection cord will be described below with reference to FIGS. 23 to 26.

As illustrated, a connection cord 200 includes at its one end portion a connector 201 that is connected to the DC output terminal 60 of the AC adaptor 54. The connection cord 200 includes at the other end portion thereof a battery adaptor 202. The battery adaptor 202 is provided with a flat-shaped connection case 203 having rails 203a, 203a (best seen in FIG. 25) that are slidably attached to the guide rails 117, 117 of the built-in camera type VTR 100 from the top portion side. A shutter member 204 is slidably attached to the rear surface of the connection case 203. A plurality of contact members 205 (FIG. 24), each being formed of a resilient metal member, are accommodated within the connection case 203 that is covered with the shutter member 204. Of these contact members 205, earth contact members 205a are projected slightly higher than other contact members 205. The above-mentioned connection case 203 includes at its both side portions formed retractable locking protrusions 206.

The shutter member 204 includes an operating member 207 integrally extended therefrom. An end portion of the operating member 207 is in contact with a slide switch 209 housed within a mold case 208 that is integrally molded with the connection case 203. The slide switch 209 is pushed by the operating member 207 and then energized. When the slide switch 209 is released from the pushing force of the operation member 207, the slide switch 209 is returned to the original position under spring force of an incorporated return spring 210. An engagement protrusion 211 is projected toward the shutter member 204 from the mold case 208.

According to the battery adaptor 202 thus arranged, when the connection case 203 is attached to the guide rails 117, 117 of the built-in camera type VTR 100, a stepped portion 207a formed on the operation member 207 comes in contact with the end portion of the supporting plate 116 to open the shutter member 204, thereby the respective contact members 205 are exposed. Then, the locking protrusions 206 are engaged with concave or recessed portions (not shown) formed on the guide rails 117, 117 at the position at which the connection case 203 is completely attached to the guide rails 117, 117, whereby the connection case 203 is locked. Accordingly, the respective contact members 205 are electrically connected to the contact members 120 of the terminal portion 121 of the built-in camera type VTR 100 side. At that time, the more extensively projected earth contact members 205a of the connection case 203 are first brought in contact with the contact member 120 of the terminal portion 121 and thereby grounded. There is then the advantage that a problem caused in an electrical signal can be readily solved.

When the respective contact members 205 of the above-mentioned connection case 203 are connected to the contact members 120 of the terminal portion 121 of the built-in camera type VTR 100, the engagement protrusion 211 formed on the connection case 203 is engaged with the engagement concave or recessed portion 101a formed on the VTR body 101 of the built-in camera type VTR 100. Therefore, the connection case 203 can be fixed with respect to the surface direction thereof.

Figure 27:
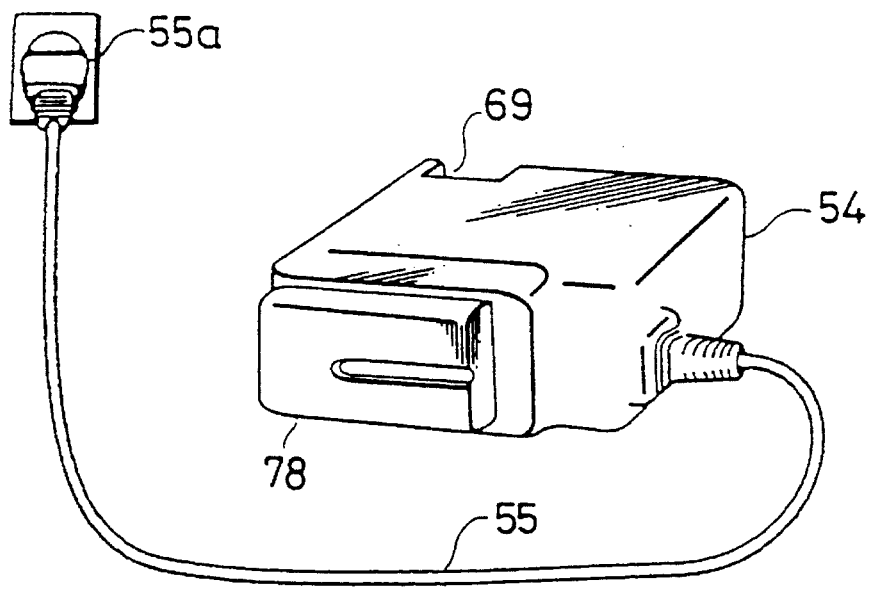
FIG. 27 is a perspective view to which references will be made in explaining an example of a battery pack charging method.

Some charging methods for the battery pack 78 will be described with reference to FIGS. 27 to 30. The charging method shown in FIG. 27 illustrates an example that the charging can be implemented by connecting the battery pack 78 to the battery compartment 71 of the AC adaptor 54.

Figure 28:
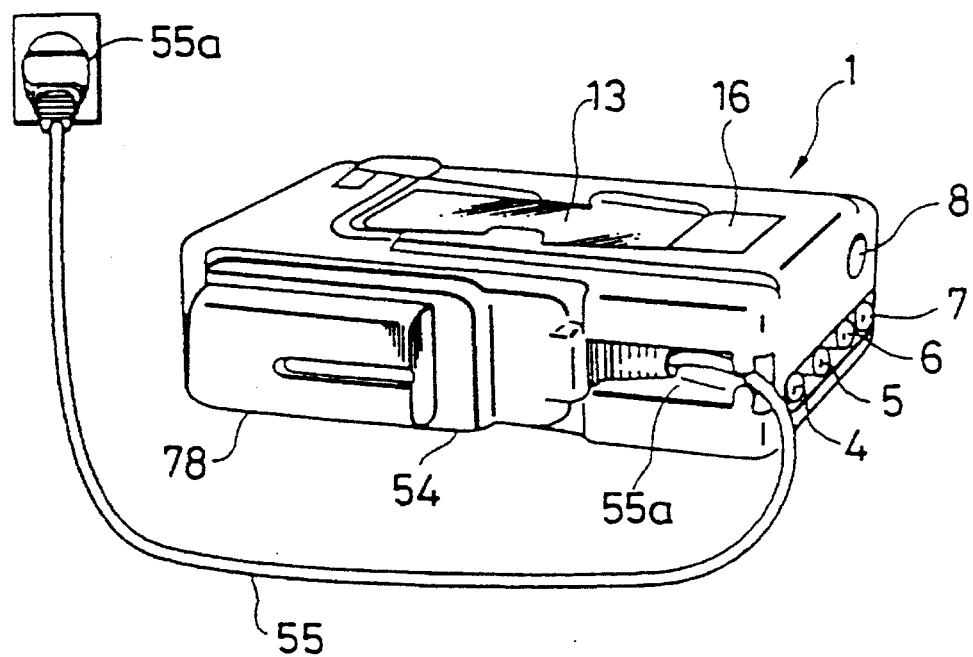
FIG. 28 is a perspective view to which references will be made in explaining another example of the battery pack charging method.

The charging method shown in FIG. 28 illustrates an example in that the charging can be implemented even though the AC adaptor 54 having the battery pack 78 connected thereto is accommodated within the compartment 10 of the station 1.

Figure 29:
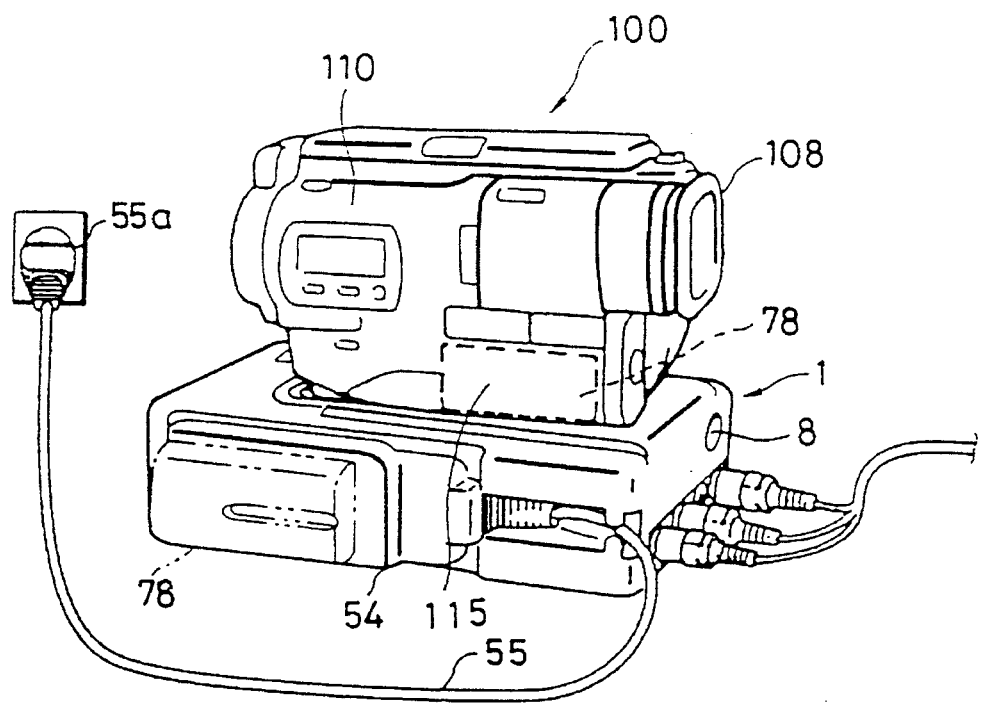
FIG. 29 is a perspective view to which references will be made in explaining still another example of the battery pack charging method.

The charging method shown in FIG. 29 illustrates an example that the battery pack 78 accommodated within the battery compartment 115 of the built-in camera type VTR 100 can be charged by connecting the AC adaptor 54 to the station 1 and by mounting the built-in camera type VTR 100 on the station 1. If another battery pack 78 is connected to the battery compartment 71 of the AC adaptor 54, then two battery packs 78 can be charged at the same time.

Figure 30:
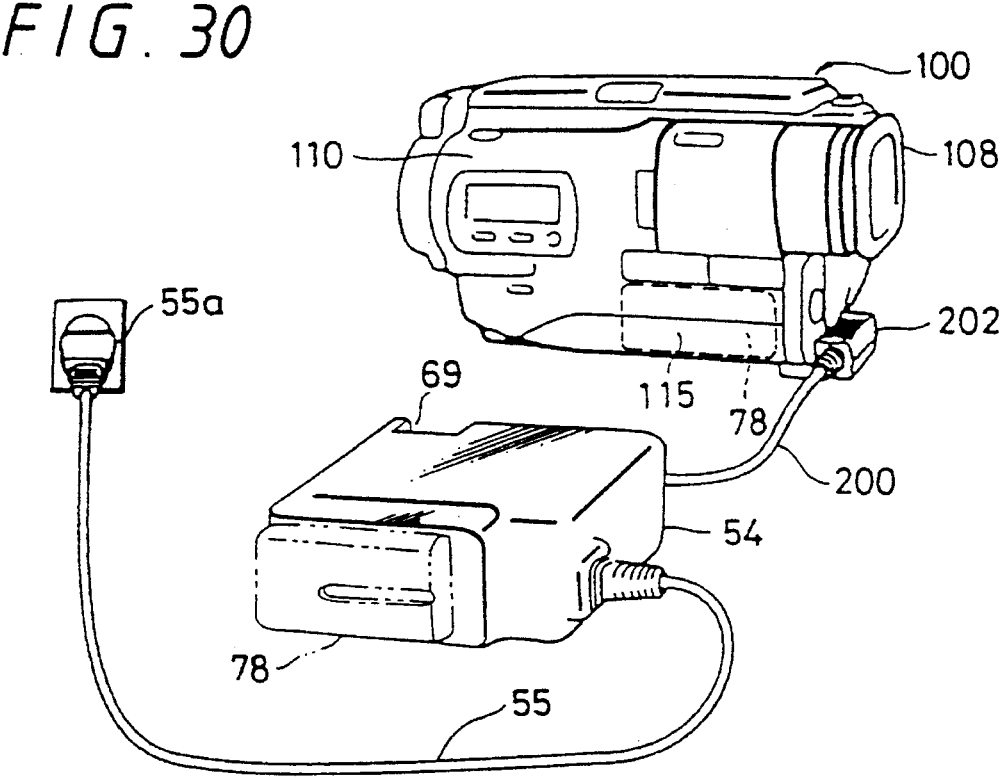
FIG. 30 is a perspective view to which references will be made in explaining a further example of the battery pack charging method.

FIG. 30 shows a method by which the battery pack 78 accommodated within the built-in camera type VTR 100 can be charged by connecting the AC adaptor 54 and the built-in camera type VTR 100 by means of the above exclusively-designed cord 200. Also in this case, if another battery pack 78 is connected to the AC adaptor 54, then two battery packs 78 can be charged at the same time.

As described above, the built-in camera type video tape recorder according to this invention can be loaded onto the connecting apparatus that connects a built-in camera type video tape recorder having video signal, audio signal, and control signal terminals and a power supply connecting terminal for connection with other electrical machinery and apparatus such as a television receiver or the like. This built-in camera type video tape recorder includes a supporting member for supporting the shutter member formed on one side wall of the built-in camera type video tape recorder, when the shutter member is opened in a ganged relation with a shutter that is opened when the built-in camera type video tape recorder is loaded onto the connecting apparatus, and a terminal portion facing an opening portion of the shutter of the supporting member and being electrically connected to a signal input and output terminal portion projected from the opening portion that is opened when the shutter of the connecting apparatus is opened. Therefore, the built-in camera type video tape recorder can be electrically connected to the connecting apparatus in a one-touch fashion without using an exclusively-designed cable, and can be readily loaded on and unloaded from the connecting apparatus. Further, the terminal portion of the built-in type videotape recorder is constantly covered with the shutter member except when the built-in camera type video tape recorder is not connected to the connecting apparatus. Hence, the terminal portion can be protected.

As set forth, the connecting apparatus for a built-in camera type VTR according to the present invention is adapted to connect the built-in camera type VTR having a video signal, audio signal, and control signal terminals and the power supply connecting terminal to other electrical machinery and apparatus such as the television receiver or the like. This connecting apparatus comprises the apparatus body connected to other electrical machinery and apparatus via the cable, the signal input and output terminal portion for connecting the respective terminals of the built-in camera type VTR to the apparatus body, the built-in camera type VTR being loaded onto the apparatus body, the shutter opening mechanism for opening the shutter provided in the apparatus body by the sliding operation, and the terminal portion ejecting mechanism for electrically connecting the signal input and output terminal portion, projected from the opening portion, to the respective terminals of the built-in camera type VTR in a ganged relation with the shutter opening mechanism. Therefore, the built-in camera type VTR can be connected to and disconnected from the connecting apparatus with ease in a so-called one-touch fashion without using the exclusively-designed cable. Thus, the built-in camera type VTR can be made more useful and convenient to use.

Moreover, since the signal input and output terminal portion is closed and locked so as not to be opened by the shutter except when the built-in camera type VTR is loaded on the apparatus body, the shutter can be prevented from being opened due to causes such as mischief or the like. There is then the effect that the signal input and output terminal portion can be protected. As described above, the power supplying apparatus of the present invention for the built-in camera type video tape recorder is adapted to supply power to the connecting apparatus that connects the built-in camera type video tape recorder having video signal, audio signal, and control signal terminals and a power supply connecting terminal and other electrical machinery and apparatus such as a television receiver or the like. Since this power supply apparatus includes the terminal portion for supplying power to the connecting apparatus and the guide portion for guiding the connecting apparatus so that the connecting apparatus is accommodated within the accommodating compartment, the connecting apparatus can be accommodated within the exclusively-designed accommodating compartment at its predetermined position accurately. Therefore, the power can be supplied to the connecting apparatus without using the exclusively-designed cable and also the above-mentioned power supplying apparatus can be utilized as the power supply for the built-in camera type video tape recorder connected to the connecting apparatus.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A power supplying apparatus for a built-in camera video tape recorder for supplying power to a connecting apparatus connecting the built-in camera video tape recorder having a video signal terminal, an audio signal terminal, a control signal terminal, and a power supply connecting terminal to another electrical apparatus, said power supplying apparatus comprising:
    a) a terminal portion for supplying power to said connecting apparatus upon which said built-in camera video tape recorder is mounted;
    b) a guide portion for guiding said power supplying apparatus within said connecting apparatus so that said power supplying apparatus is accommodated into an accommodating compartment within said connecting apparatus; and
    c) a battery connecting portion for receiving a battery pack and for recharging said battery pack.

2. The power supplying apparatus according to claim 1, wherein said battery connecting portion includes a shutter member for protecting an electrode pin when said shutter member is closed and for exposing said electrode pin to connect said electrode pin to a battery terminal on said battery pack when said shutter member is opened.

3. The power supplying apparatus according to claim 2, wherein said battery connecting portion includes a battery connecting locking ratchet and a concave portion for detecting a kind and capacity of a battery.

4. The power supplying apparatus according to claim 1, wherein said battery connecting portion includes a battery connecting locking ratchet and a concave portion for detecting a kind and capacity of a battery.

5. The power supplying apparatus according to claim 1, wherein said power supplying apparatus is releasably retained within said connecting apparatus.

6. The power supplying apparatus according to claim 1, further comprising a connection cord for connecting said built-in camera video tape recorder to said power supplying apparatus, said connection cord including a slide shutter member for opening and closing a tab member and a switch that is energized or disabled in a ganged relation with a slide operation of said shutter member.

7. The power supplying apparatus according to claim 1, further comprising a connection cord for connecting said built-in camera video tape recorder to a DC output of said power supplying apparatus, said connection cord including a slide shutter member and a set of contacts at one end of said cord, said slide shutter exposing said set of contacts upon insertion of said one end of said cord into said built-in camera video tape recorder.

8. The power supplying apparatus according to claim 7, wherein said DC output from said power supplying apparatus recharges a battery pack which is attached to said built-in camera video tape recorder.

9. The power supplying apparatus according to claim 1, wherein said power supplied to said connecting apparatus recharges a second battery pack which is attached to said built-in camera video tape recorder.

10. The power supplying apparatus according to claim 1, wherein power supplying apparatus receives receives AC power and said terminal portion supplies said connecting apparatus with DC power.

11. A power supplying apparatus for a built-in camera video tape recorder for supplying power to a connecting apparatus connecting the built-in camera video tape recorder having a video signal terminal, an audio signal terminal, a control signal terminal, and a power supply connecting terminal to another electrical apparatus, comprising:
    a) a terminal portion for supplying power to said connecting apparatus upon which said built-in camera video tape recorder is mounted;
    b) a guide portion for guiding said power supplying apparatus within said connecting apparatus so that said power supplying apparatus is accommodated into an accommodating compartment within said connecting apparatus;
    (c) a battery connecting portion having a power charging function on said power supplying apparatus; and
    (d) a connection cord for connecting said built-in camera video tape recorder to said power supplying apparatus, said connection cord including a slide shutter member for opening and closing a tab member and a switch that is energized or disabled in a ganged relation with a slide operation of said shutter member;
    wherein said battery connecting portion includes a battery connecting locking ratchet and a concave portion for detecting a kind and capacity of a battery.

* * * * *